(12) United States Patent
Kianzad

(10) Patent No.: US 12,386,426 B2
(45) Date of Patent: Aug. 12, 2025

(54) ENHANCED INTERACTION WITH A COMPUTING AGENT THROUGH A HAPTIC DEVICE

(71) Applicant: SENSE SCIENCE LAB LIMITED, Toronto (CA)

(72) Inventor: Soheil Kianzad, Toronto (CA)

( * ) Notice: Subject to any disclaimer, the term of this patent is extended or adjusted under 35 U.S.C. 154(b) by 0 days.

(21) Appl. No.: 18/389,963

(22) Filed: Dec. 20, 2023

(65) Prior Publication Data

US 2025/0208712 A1   Jun. 26, 2025

(51) Int. Cl.
| | |
|---|---|
| B43K 29/08 | (2006.01) |
| G06F 3/01 | (2006.01) |
| G06F 3/0354 | (2013.01) |
| G06F 3/041 | (2006.01) |
| G06F 3/16 | (2006.01) |
| G06F 9/451 | (2018.01) |
| H04L 51/02 | (2022.01) |

(52) U.S. Cl.
CPC .......... G06F 3/016 (2013.01); G06F 3/03545 (2013.01); G06F 3/041 (2013.01); G06F 3/167 (2013.01); G06F 9/453 (2018.02); H04L 51/02 (2013.01)

(58) Field of Classification Search
CPC ...... G06F 3/016; G06F 9/453; G06F 3/03545; G06F 3/041; G06F 3/167; H04L 51/02; B43K 29/10

USPC ........................................................ 434/335
See application file for complete search history.

(56) References Cited

U.S. PATENT DOCUMENTS

2015/0336421 A1\* 11/2015 Neubauer .............. B43K 29/10
                                                434/335

\* cited by examiner

*Primary Examiner* — Abdul-Samad A Adediran
(74) *Attorney, Agent, or Firm* — Walker Griffin Weitzel; Alloy Patent Law

(57) ABSTRACT

The present invention describes an innovative robotic companion device shaped as a stylus, marking a breakthrough in robotic technology. The device's stylus form factor is strategically chosen, not just for aesthetic appeal but for its functional benefits in augmenting user interaction and engagement. Integrating advanced technologies such as artificial intelligence, machine vision, and natural language processing, the robotic stylus companion offers a range of functionalities. These include personalized assistance, entertainment, and companionship, all delivered in a manner that is intuitive and natural for the user. The device's unique combination of form and function, coupled with cutting-edge technological integration, makes it a versatile and user-friendly companion, capable of adapting to various user needs and enhancing daily activities with seamless, interactive experiences.

16 Claims, 10 Drawing Sheets

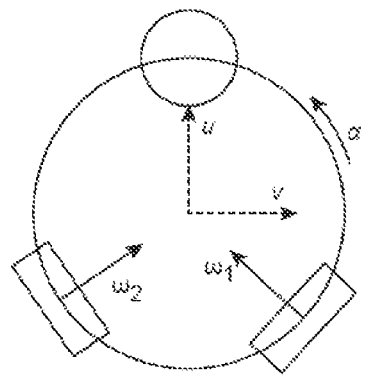
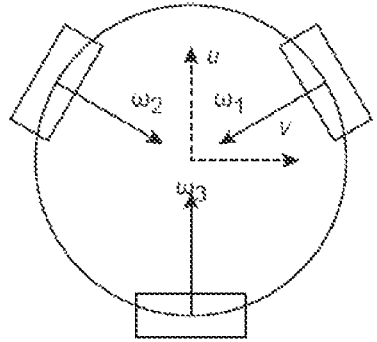
FIG. 5A  FIG. 5B
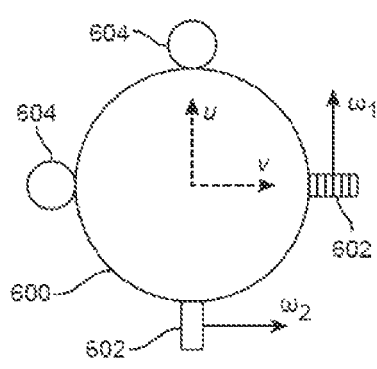
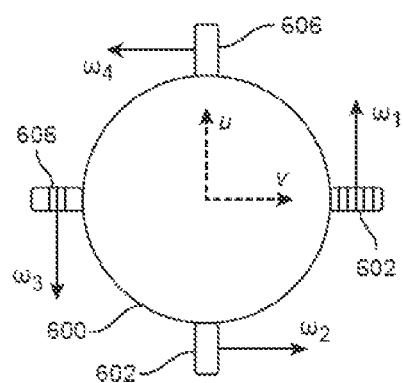
FIG. 6A  FIG. 6B

ENHANCED INTERACTION WITH A COMPUTING AGENT THROUGH A HAPTIC DEVICE

FIELD OF THE INVENTION

The present invention relates generally to robotic devices. More specifically, it pertains to a robotic companion device designed in the form of a stylus. This device integrates advanced technologies such as artificial intelligence, machine vision, and natural language processing. Its purpose is to provide personalized assistance, entertainment, and companionship, enhancing user interaction and engagement through its innovative design and capabilities.

BACKGROUND

The development of this invention is driven by the goal to revolutionize human-computer interaction by significantly enhancing the capabilities of stylus-based devices. Central to this innovation is the integration of haptics and force feedback, aligned with artificial intelligence (AI) to facilitate a deeper and more intuitive collaboration with an AI agent.

Traditionally, styluses have been passive tools, offering basic input functionalities without any active feedback or guidance. This invention marks a departure from this norm by introducing a robotic stylus companion capable of autonomous motion. This ability allows the stylus to not only guide a user's hand with precision but also provide dynamic and responsive interactions through real-time force feedback. The integration of AI furthers this capability, enabling the stylus to respond and adapt to the user's actions and preferences.

At the heart of this invention is the haptic feedback mechanism, deeply rooted in the science of haptics. This feature focuses on tactile sensations and feedback, which is crucial for creating a bridge between human users and computer systems. By leveraging advanced haptic technology, the stylus promises interactions that are not just responsive but also highly immersive, simulating a wide range of tactile experiences.

Incorporating force feedback in a device like this necessitates a grounding mechanism against which the force can be exerted. Traditionally, this has been achieved using a "world-grounded" robotic arm, which, while effective, introduces constraints such as tethering and limited mobility. Tethering, whether due to cables for power and data transfer or mechanical linkages to a grounded device, restricts the workspace and user freedom.

The invention seeks to overcome the limitations posed by traditional force feedback mechanisms, which often require bulky motors, robust linkages, and high-fidelity sensors, leading to increased weight, size, and cost. Additionally, these systems often face challenges in maintaining a wide range of impedance, a key factor in haptic feedback.

Moreover, force feedback has been shown to significantly enrich sensory perception and cognitive assimilation, particularly in virtual environments. The foundational method for delivering spatial force feedback involves user manipulation of an end-effector, like a stylus tip, with the system responding with aligned reaction forces based on the virtual model's spatial construct.

In historical haptic research, shared haptic control has been identified as beneficial in enhancing task speed and precision in human-robot collaboration, reducing visual dependency, and decreasing the control exertion required by the user. This invention builds on these principles by integrating a more advanced blend of sensing technologies and feedback protocols, surpassing previous models like Kianzad et al.'s approach in sketching tools.

The pursuit of untethered, mobile force feedback has led to the exploration of wearable mechanisms that deliver forces to specific body parts. However, these solutions often face challenges in terms of size, weight, and restricted rendering capabilities. The proposed invention aims to address these limitations by providing a novel, integrated solution that combines mobility, precision, and a rich haptic experience.

The innovation landscape surrounding this invention is rich with prior art and technological advancements, as evidenced by numerous patents and research endeavors. These references have laid the groundwork for the development of the current invention, each contributing unique aspects to the field of haptics, robotics, and human-computer interaction. For instance, the concept of the Balancing Mobile Robot (BMR), as explored in earlier patents, introduces a novel approach in robotics, combining the principles of an inverted pendulum with a motor-driven platform. This technology is instrumental in understanding the dynamics of balancing and movement, which are crucial for the development of a stylus capable of autonomous motion and precise force feedback. The historical evolution of force feedback devices, as outlined in patents like U.S. Pat. No. 7,508,382 B2 and U.S. Pat. No. 7,265,750 B2, reveals a trajectory of innovation focused on enhancing tactile feedback and interaction fidelity. These patents, dealing with haptic pens and mechanisms to modulate friction and force in writing instruments, provide insights into the mechanics of creating realistic tactile experiences. The knowledge gleaned from these inventions is invaluable in developing a stylus that not only interacts with users but also provides a realistic and responsive feedback mechanism. The exploration of tethering and its implications, as well as the strategies to achieve untethering, are critical in the design of the current invention. Past inventions have often been limited by the need for physical connections for power and data transfer, which restricts mobility and user freedom. Overcoming these limitations requires innovative approaches, as seen in wearable haptic devices and wireless communication technologies. This background forms a foundation for the present invention's aim to provide a fully untethered and mobile experience. Additionally, the exploration of haptic feedback in 2D and 3D contexts, highlights the challenges and complexities involved in rendering realistic force feedback in different spatial dimensions. This understanding is pivotal in designing a stylus that can accurately simulate a wide range of tactile sensations and interactions.

The advancements in collaborative robotic systems, particularly Cobots, have also informed the development of this invention. While these systems have been primarily passive, their application in creating smooth, rigid virtual interfaces and path planning offers valuable insights for designing an interactive stylus that can guide and respond to user movements. Finally, the evolution of writing instruments, particularly ballpoint pens, as seen in patents like U.S. Pat. No. 9,116,560 B1, serves as a historical reference point. The principles of modulating friction and force in these instruments have been instrumental in understanding how to create a stylus that not only writes but also interacts with the user in a more dynamic and responsive manner.

Thus, there is a need for an improved solution. By integrating advanced haptic feedback, AI, and autonomous motion capabilities into a stylus form factor, it promises to offer users a more immersive, intuitive, and responsive interaction experience. The design and technology behind this invention address and overcome the limitations of existing systems, paving the way for a new era of interactive devices.

SUMMARY

The present invention pertains to innovative solutions and embodiments devised to rectify prevalent shortcomings.

The present invention represents a significant leap in the realm of robotic technology, manifesting as a robotic companion device meticulously designed in the form of a stylus. This unique form factor is not merely a stylistic choice but a functional one, aimed at enhancing user interaction and engagement in a multitude of ways. The robotic stylus companion is a convergence of cutting-edge technologies, including but not limited to artificial intelligence, machine vision, and natural language processing. These technologies collectively enable the device to provide personalized assistance, deliver entertainment, and offer companionship in a way that feels intuitive and natural to the user.

The ergonomic design of the stylus is a key feature, ensuring comfortable handling and ease of control. Its form factor is crafted to be seamlessly integrated into the user's daily life, whether it be for professional tasks, creative endeavors, or leisure activities. The patent encompasses not only the distinctive design of this device but also the unique functionality and interaction methods it employs. This includes its capability to engage in a range of tasks and activities, from executing specific commands to playing games and participating in natural, conversational exchanges with the user.

A particularly innovative aspect of this invention is its ability to provide untethered, grounded force feedback during activities such as sketching on any two-dimensional surface. This includes a variety of grounding surfaces like whiteboards, tabletops, and tablets. The device allows users to experience a tangible sense of force feedback while engaging in full-arm movements, or even while walking along extended surfaces. This feature opens up new possibilities for interaction and creativity, making the experience more immersive and tactile.

The visual experience offered by the robotic stylus companion is equally impressive. It encompasses a wide range of displays and formats, including static sketches, printed images, and various screen-based interfaces like graphical touchscreens. Moreover, it extends to more dynamic and immersive mediums such as animated surface displays, dynamic projections, augmented reality, virtual reality, and mixed reality. This versatility makes the device an ideal personal assistant, entertainer, and companion, adept in a broad spectrum of tasks and interactions.

The device shines particularly in learning scenarios, backed by a personalized artificial intelligence system that retains a history of interactions. This enables the stylus-shaped robot to adapt and personalize its responses and functionalities according to the user's individual preferences and past interactions. The patent safeguards this unique amalgamation of stylus-based robotics, grounded force feedback, mixed reality interactions, and AI-enabled personalization, all of which culminate to make the stylus shape robot companion a groundbreaking invention in the field of robotic technology.

The concept of "Enhanced Interaction" as applied to the robotic companion device in question is multifaceted, encompassing a range of functionalities that collectively aim to enrich the user's experience. This enhanced interaction is not confined to basic commands and responses but extends to a more personalized, engaging, and intuitive level of communication and assistance. One of the key aspects of enhanced interaction is Personalized Assistance. The robotic companion is designed to offer assistance that is tailored to the individual needs, preferences, and tasks of each user. This is made possible through the incorporation of sophisticated artificial intelligence algorithms. These algorithms enable the device to understand and respond effectively to user requests, questions, and commands. The AI-driven assistance is not generic but is adapted to the user's unique preferences and historical interactions, making the experience more relevant and helpful. Another vital component of enhanced interaction is Entertainment and Engagement. The device is equipped to offer a range of entertainment features and engaging activities. This might include playing games, telling stories, or providing interactive experiences designed to captivate the user's interest. These features aim to create an enjoyable and immersive interaction, transforming the device from a mere tool to an engaging companion that can entertain and keep the user engaged in various scenarios. Natural Language Interaction plays a crucial role in this enhanced interaction model. The device leverages natural language processing capabilities, allowing users to engage in conversations that mimic human-like interaction. Users can communicate with the device verbally, ask questions, and receive spoken responses in a natural and intuitive manner. This capability makes the interaction with the device feel more natural and less mechanistic, akin to conversing with a human. Finally, Seamless Integration is a defining characteristic of the robotic companion. The stylus-like form factor of the device is specifically designed for comfortable handling and intuitive control. This design choice enables the device to seamlessly integrate into the user's daily life and activities. The ease of integration enhances the user's ability to interact with the device effortlessly, making it a convenient and accessible companion in a variety of tasks and scenarios. In essence, the device is designed to be an extension of the user's environment, offering assistance, entertainment, and interaction in a manner that feels natural and unobtrusive.

The present invention discloses a transformative tool that significantly enhances the scope of verbal communication and sketching, providing a seamless interface for collaboration with computing systems and AI agents. This innovation enables users to externalize their thoughts, ideas, and concepts more effectively, fostering enriched interactions with computational technologies. In scenarios involving verbal communication, the invention stands out by enabling users to engage in natural and intuitive conversations with AI agents and computing collaborators. It utilizes advanced natural language processing algorithms, adept at understanding various user queries, responding with relevant information, and offering personalized assistance tailored to the user's needs and preferences. The stylus-shaped robotic companion serves as a vital conduit, bridging the gap between the user and computational systems, thereby facilitating a streamlined and coherent communication process. When it comes to sketching, the invention offers precise and intuitive tools that aid in the externalization of ideas and concepts. Users can employ the stylus-like device to draw and sketch on their chosen two-dimensional surface, whether it be a whiteboard, tablet, or another medium. This functionality is crucial for visualizing and communicating ideas in a graphical format. The device adeptly captures and translates these sketches into digital representations, allowing for enhanced manipulation, annotation, and collaborative interaction with computing systems. AI agents within the device play a supportive role in this process, assisting in object recognition, providing contextual suggestions, and overall enhancing the sketching experience. The integration of verbal communication capabilities with haptic sketching tools makes this invention a potent platform for collaboration between users and computational systems. It significantly boosts the externalization of creative ideas, fosters enhanced brainstorming sessions, and facilitates effective communication and collaboration. This is particularly beneficial in fields like design, education, and problem-solving, where visual and verbal articulation of ideas is paramount. Moreover, the versatility of this invention is evident in its adaptability to various scenarios and interactions. Its portable nature and ability to function across different settings make it a unique tool. Unlike traditional force-feedback devices that are often restricted to desktop settings, this invention offers haptic interactions suitable for scenarios that demand significant mobility and a larger workspace. The device is designed to roll on any given two-dimensional surface, exerting forces, proactively guiding users, and enabling the exploration and generation of forces in interaction with the environment. This adaptability and functionality make the invention not just a tool for communication and collaboration but a comprehensive companion for creative and professional endeavors.

The present invention can be aptly described as a "haptic sketch pad," designed to function akin to an idea napkin, thereby facilitating creative brainstorming and interactive sessions between the user and a computing agent. This innovative system integrates a variety of haptic elements, each contributing to a rich and multifaceted user experience. One of the key features of this system is its force-feedback mechanics. This technology enables the manipulation of elements within both static and dynamic virtual environments. For instance, users can interact with static elements like virtual walls or engage with dynamic components such as flexible springs or objects in motion, like hitting a virtual ball. This feature not only enhances the realism of the virtual environment but also broadens the scope of interaction possibilities within it. Another significant aspect of the invention is force directionality. Here, users are subtly guided via forces along specific paths, enhancing the precision and intentionality of their movements. This can be particularly useful in scenarios where precision is key, such as in design or educational settings. The system also offers force-feedback structures that create passive boundaries or templates, akin to virtual rulers or compasses, aiding in the design and creation of shapes and patterns. The invention further supports cooperative engagements, allowing for interaction and collaboration with both humans and AI. This feature enables users to gain clear insights into their collaborative efforts, understanding the focus and objectives of their collective work. In shared spaces, multiple users can interact using their individual devices, promoting teamwork and collective creativity. Tactile sensations are also a cornerstone of this system. The device can produce a range of sensations, including vibrations, patterns, and elevated spots, corresponding to specific events or locations within the virtual environment. These sensations are designed to augment the sensory interaction without exerting force on the user's limb, offering a more nuanced and varied haptic experience. Lastly, the invention allows users to form elements within a virtual environment through drawing. This functionality grants users the ability to touch, feel, and engage with these virtual components using the same apparatus. The seamless integration of drawing and tactile interaction in a virtual space opens up new avenues for creativity and exploration, making this invention a powerful tool for users seeking a comprehensive and immersive virtual interaction experience.

The present invention represents a versatile tool with a wide array of applications, each distinguished by their interactive nature and enhanced by the device's advanced computational capabilities. In the realm of education, the invention serves as a dynamic educational interface. It acts as an informed peer in the learning process, utilizing the computational strength of an embedded AI agent. This AI-driven interaction enriches the educational experience by providing dynamic feedback and facilitating collaborative learning environments. Its ability to adapt to different learning styles and needs makes it an invaluable tool in modern pedagogical settings, offering a more personalized and interactive approach to education. In the field of augmented reality and computer-aided design (CAD), the invention functions as an invaluable assisting entity. It leverages the computational capabilities of the embedded AI agent to provide nuanced guidance and collaborative design insights. This is particularly beneficial in complex design scenarios where precision and creativity are key. The AI's ability to process and analyze design parameters enhances the user's ability to conceptualize, visualize, and execute designs in a more efficient and intuitive manner. When it comes to Graphical User Interfaces (GUIs), the invention significantly elevates the level of interaction. It employs the AI's computational power to streamline the user experience, accurately predict user intent, and enhance the responsiveness of the interface. This leads to a more intuitive and efficient interaction with digital systems, reducing the cognitive load on the user and improving the overall usability of the GUI. The invention also stands out as a vital assistive technology. It provides substantial support for individuals with perceptual, cognitive, or motor impairments. By harnessing the computational capacity of the AI agent, the device intuitively understands and adapts to the user's unique needs, offering real-time, tailored assistance. This adaptability ensures that the technology is not only accessible but also highly effective in enhancing the independence and quality of life for users with various impairments. In conclusion, the versatility and adaptability of the invention, augmented by its integration with advanced AI, make it a transformative tool across numerous sectors. From enhancing educational experiences and aiding in complex design tasks to improving user interactions with digital interfaces and providing assistive support, the invention stands as a pivotal advancement in interactive technology. Its broad spectrum of applications highlights its potential as a cornerstone in various fields, revolutionizing the way we interact with computational systems.

BRIEF DESCRIPTION OF THE ACCOMPANYING DRAWINGS

The novel features which are believed to be characteristic of the present invention, as to its structure, organization, use, and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which:

FIG. 1 is a block diagram illustrating an example computing agent system which may be used to implement examples, in accordance with an embodiment of the present invention.

In FIG. 2, in accordance with an embodiment of the present invention, a haptic stylus is presented with motors (202) driving rollers (204) which actuate a surface-contact ball (200) housed within the device body (210). Optional components include a linear actuator (206) to adjust pressure on the ball, a processing unit (208) powered by batteries (212), and a wireless communication module (214).

FIGS. 5(A) and 5(B) showcase two actuation configurations with three contact points, in accordance with an embodiment of the present invention. FIG. 5(A) features two actuated and one non-actuated rollers in a tricycle setup and FIG. 5(B) displays three independently actuated rollers, noting the benefits and challenges of such a design.

In FIGS. 6(A) and 6(B), four contact points are highlighted: FIG. 6(A) employs two actuated rollers balanced by two non-actuated ones, in accordance with an embodiment of the present invention. FIG. 6(B) utilizes four actuated contact points working in synchronized opposing pairs, in accordance with another embodiment of the present invention.

Figure 7:
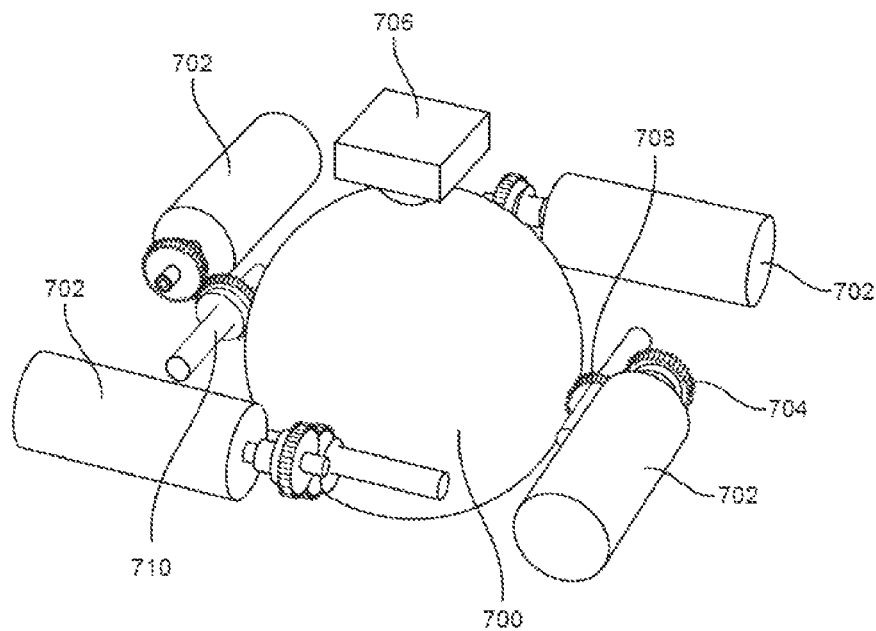

FIG. 7 provides a detailed view of the actuator arrangement from FIG. 6(B), in accordance with another embodiment of the present invention.

Figure 8A:
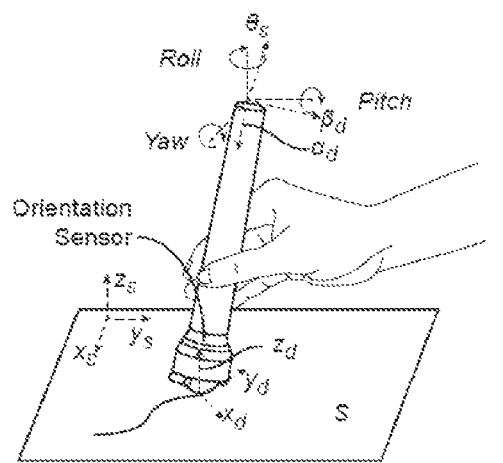
Figure 8B:
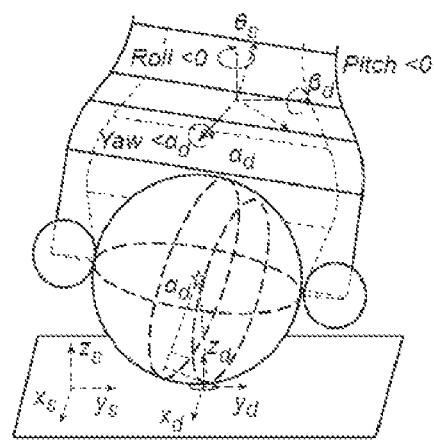

FIGS. 8(A) and 8(B) demonstrate the drive system's rectilinear and rotational coordinates concerning a stylus grip, optimizing user dexterity. FIG. 8(A) defines the device orientation (roll, pitch, and yaw) relative to the surface normal vector, highlighting the contact point at xS,yS, in accordance with an embodiment of the present invention. FIG. 8(B) zooms in on the contact ball during yaw, emphasizing the divergence of the contact point from the ball's axis and referencing Eqs. 3-4 for parallax corrections, in accordance with an embodiment of the present invention.

Figure 9:
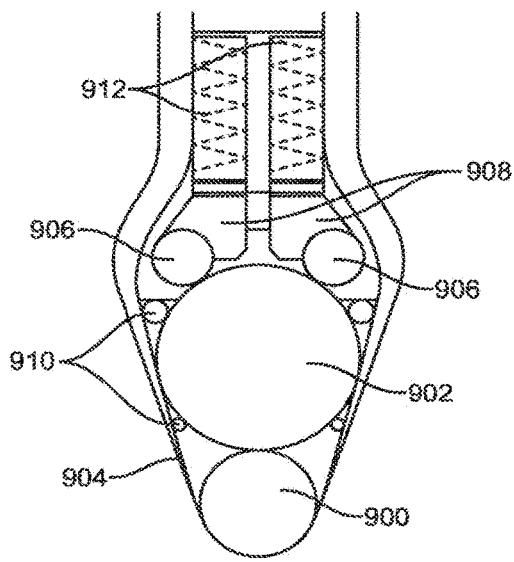

FIG. 9 presents a design minimizing visual obstruction from a large contact ball, in accordance with an embodiment of the present invention. It uses a secondary ball 902 in the drive train, between the driving rollers 906 and the surface-contact ball 900, to achieve a more compact tip 904. The driving rollers 906 relay torque from the actuators 704 to the secondary ball 902. An increase in the secondary ball's radius enhances grip and torque transmission, subsequently boosting propulsion strength through the drive train. Linear actuators 912 modulate the pressure between rollers 906 and ball 902, balancing grip and mechanical impedance.

Figures 10A, 10B:
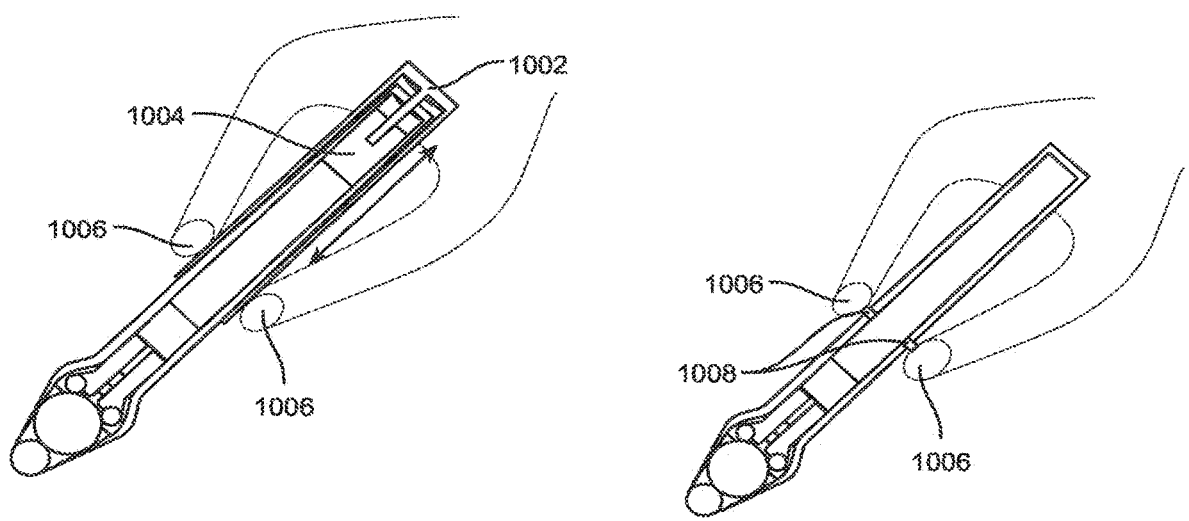

FIGS. 10(A) and 10(B) unveil two designs utilizing embedded linear actuators to induce a relative movement along the stylus's axis against the user's finger pad 1006, in accordance with another embodiment of the present invention. This movement applies shear forces to finger pads 1006, simulating a tactile sensation via skin stretch. FIG. 10(A) employs an internal actuator 1004 adjusting the barrel cover's 1002 position, while FIG. 10(B) utilizes tactors 1008 to apply direct shear forces on the user's finger pads.

Figure 11:
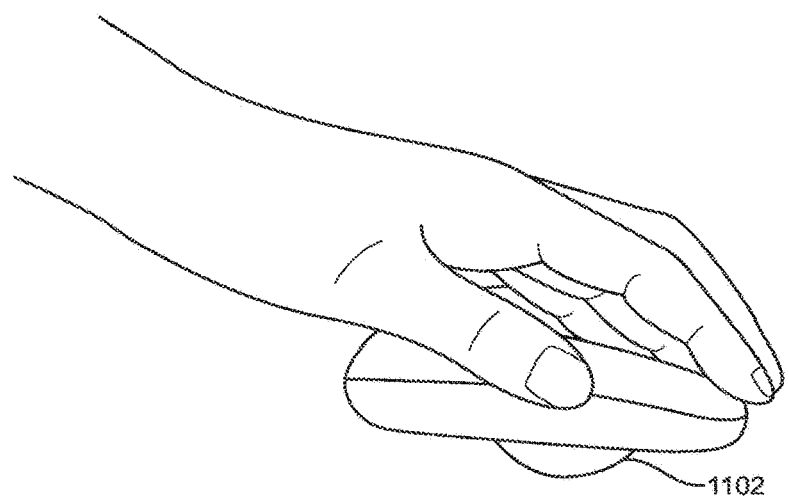

FIG. 11 displays the invention in a mouse form factor, grasped using a palm grip, in accordance with another embodiment of the present invention. A sensor 1102, akin to those in traditional computer mice, registers the device's two-dimensional movements.

Figure 12A:
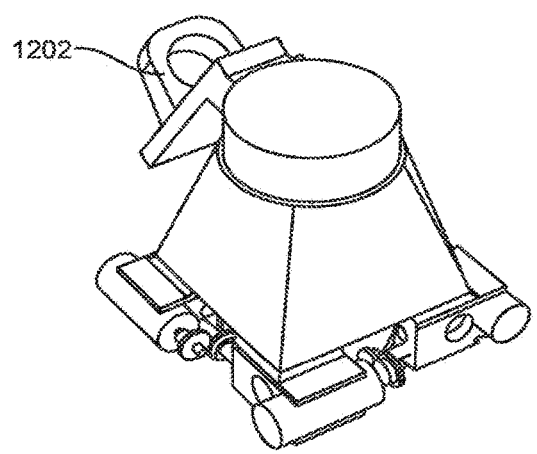
Figure 12B:
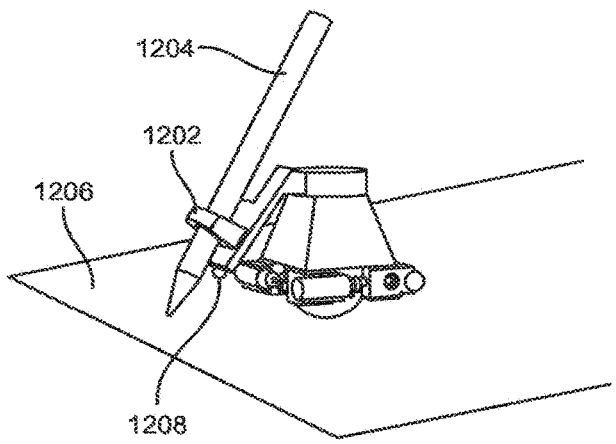

FIGS. 12(A) and 12(B) present a pen-holder embodiment. It accommodates drawing or pointing implements (like pencils or markers), with the user experiencing force-feedback through the held implement. The stylus grip is emphasized in this design, in accordance with an embodiment of the present invention.

Figure 13A:
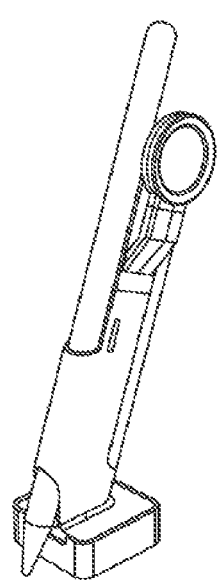
Figure 13B:
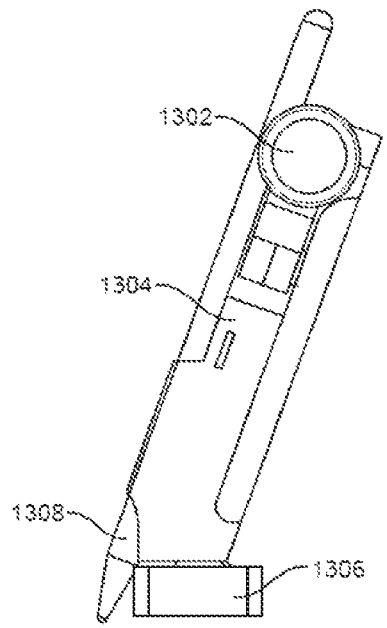

FIGS. 13(A) and 13(B) showcase an embodiment featuring an integrated graphical screen 1302, which can display the robot's face or intricate interaction details or end results, in accordance with an embodiment of the present invention. As the device provides 2D force feedback 1306, it can guide the user's hand for precise navigations or drawing tasks.

Figure 14A:
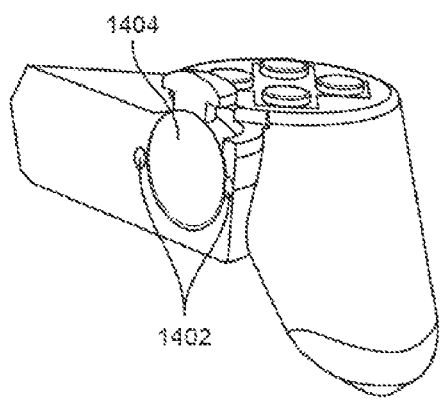
Figure 14B:
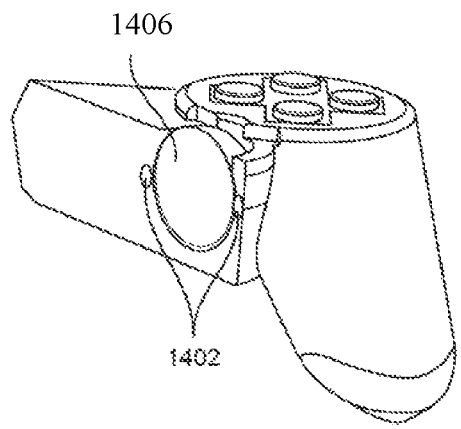

FIGS. 14(A) and 14(B) detail a force-feedback thumb-stick, drawing from the mechanisms of FIG. 6(B) and FIG. 7, in accordance with another embodiment of the present invention. The actuators 1402 control a "surface contact ball", fashioned as either FIG. 14(A) a thumb-stick 1404 or FIG. 14(B) a track wheel 1406.

Figure 15:
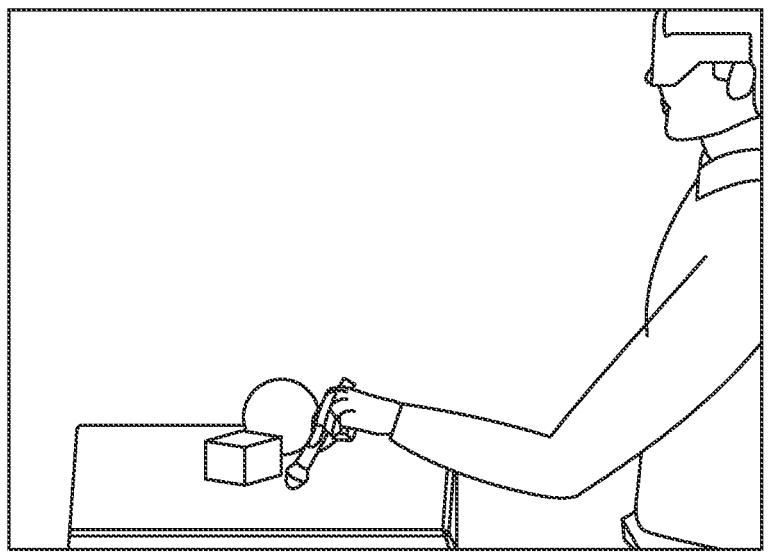

FIG. 15 illustrates an embodiment allowing the physical pen to interact within a virtual environment. Users, donned in augmented/virtual reality gear, employ the pen; an optional vision sensing system can be used to detect the haptic pen tip's location, in accordance with another embodiment of the present invention.

Figure 16:
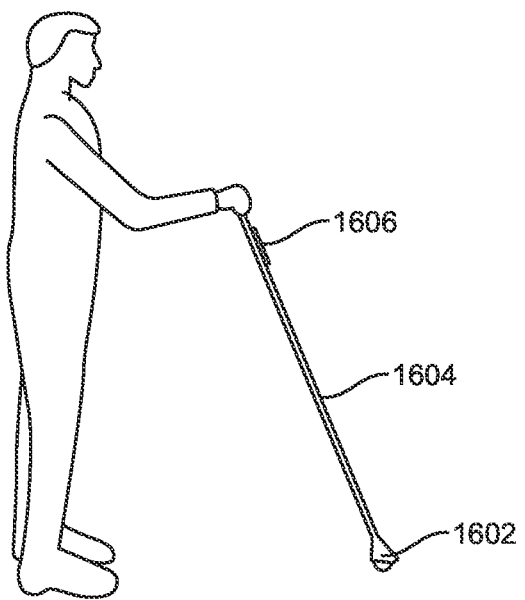

FIG. 16 portrays an embodiment resembling an advanced white cane for users with visual impairments, in accordance with an embodiment of the present invention. With the aid of optical or ultrasonic sensors, this cane detects obstructions and directs users towards designated locations, like exits or elevators.

Further areas of applicability of the present invention will become apparent from the detailed description provided hereinafter. It should be understood that the detailed description of exemplary embodiments is intended for illustration purposes only and is, therefore, not intended to necessarily limit the scope of the invention.

DETAILED DESCRIPTION

As used in the specification and claims, the singular forms "a", "an" and "the" may also include plural references. For example, the term "an article" may include a plurality of articles. Those with ordinary skill in the art will appreciate that the elements in the Figures are illustrated for simplicity and clarity and are not necessarily drawn to scale. For example, the dimensions of some of the elements in the Figures may be exaggerated, relative to other elements, to improve the understanding of the present invention. There may be additional components described in the foregoing application that are not depicted on one of the described drawings. In the event such a component is described, but not depicted in a drawing, the absence of such a drawing should not be considered as an omission of such design from the specification.

It should be observed that the present invention utilizes a combination of components or set-ups, which constitutes a robotic companion apparatus embodied as a stylus. Accordingly, the components have been represented, showing only specific details that are pertinent for an understanding of the present invention so as not to obscure the disclosure with details that will be readily apparent to those with ordinary skill in the art having the benefit of the description herein.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

The words "comprising," "having," "containing," and "including," and other forms thereof, are intended to be equivalent in meaning and be open ended in that an item or items following any one of these words is not meant to be an exhaustive listing of such item or items or meant to be limited to only the listed item or items. Unless stated otherwise, terms such as "first" and "second" are used to arbitrarily distinguish between the elements. Thus, these terms are not necessarily intended to indicate temporal or other prioritization of such elements. While various exemplary embodiments of the disclosed invention have been described below it should be understood that they have been presented for purposes of example only, not limitations. It is not exhaustive and does not limit the invention to the precise form disclosed. Modifications and variations are possible considering the above teachings or may be acquired from practicing of the invention, without departing from the breadth or scope.

The invention described herein pertains to a robotic companion apparatus embodied as a stylus, purposed to elevate interaction modalities and user involvement. This apparatus integrates sophisticated robotic mechanisms, including but not limited to, artificial intelligence and natural language processing capabilities. In its function, the robotic companion stylus delivers specialized assistance, amusement, and social interaction. The ergonomic configuration of the stylus promotes ease of manipulation and intuitive oversight, enabling effortless assimilation into the routines of an end-user. The intellectual property rights of this invention serve to protect the unique design elements, operational modalities, and specific interaction techniques associated with the stylus embodied robotic companion.

Furthermore, the disclosed invention provides for an interaction implement and an ensemble of methodologies that facilitate unattached, foundational force feedback when illustrating on a multitude of bidimensional anchoring mediums, inclusive of but not limited to, whiteboards, desktop surfaces, and electronic tablets. Through engagement with this portable implement, users are granted the tactile sensation of force feedback, even during extensive gestural movements or while navigating expansive surfaces. The visual component of this interaction encompasses a myriad of displays such as static drawings, pre-printed visuals, touch-responsive graphical screens, kinetic visual exhibitions, animated projections, as well as engagements in augmented, virtual, and hybrid reality environments using visual enhancement devices. The stylus-embodied robotic companion is adept as a multifunctional personal aide, entertainment source, and social partner, capable of task execution, query resolution, gameplay, and fluid conversational engagement. The device is notably effective in adaptive scenarios, employing a tailored artificial intelligence mechanism that maintains an exhaustive log of past engagements. The intellectual property rights delineated herein are designed to protect the novel amalgamation of stylus-integrated robotics, foundational force feedback, hybrid reality engagements, and AI-driven customization inherent to the robotic companion stylus.

The disclosed invention provides for voice and graphic collaboration facilitated by an AI computational entity. This operational modality enables users to interface with said computational entity through both vocal dialogues and illustrative representations, paving the way for an organic and instinctual communication medium. Through vocal directives and graphic illustrations, users can impart concepts, procure tailored assistance, and participate in collective reasoning or inventive ventures.

Central to the invention is the support for oral dialogue. Users have the capability to converse with the AI computational entity, expound ideas, proffer queries, and acquire directives or elucidations. The integration of natural language processing mechanisms within the invention augments fluid and bi-directional vocal interactions, bolstering information dissemination and reciprocal comprehension. The envisioned modalities of operation for the disclosed invention have potential benefits spanning various application domains. Recognizing these operational forms elucidates the specific utility of this invention across disparate application spheres.

Directive Haptic Feedback: Applications might harness the invention's dynamic force feedback for guidance objectives, steering users to designated objectives or delineating boundaries.

Content Generation: The invention's stylus-like embodiment facilitates content generation, be it through graphic illustrations or through the demarcation of environmental attributes on passive media like paper or whiteboards.

Motoric Training: Applications can accentuate or condition muscular activities via haptically simulated virtual constraints or cues.

Manipulative or Cognitive Embodiment: End-users can traverse and manipulate virtual environments, deriving benefits of embodiment, especially in comprehending mathematical or abstract concepts.

2D Graphic Mediation for Pen/Paper Interactions: Upon receiving user's graphic or handwritten inputs, the invention can guide the user in crafting a commensurate output. The user's hand thus becomes an animated graphical interface, for instance, enabling them to craft geometrically accurate figures on physical media post receiving corresponding commands.

The present invention introduces a multifaceted approach to educational collaboration, harnessing the power of AI integration to revolutionize modern pedagogical tools. It marks a significant paradigm shift in educational methodologies by synergizing haptic force feedback with verbal and visual cues, all orchestrated by an AI agent. This triad ensures a comprehensive and holistic learning experience, catering to the diverse needs of learners and fostering a profound knowledge construction process.

AI-mediated multi-modal collaboration is at the forefront of this innovation. The invention, with its amalgamation of tactile, vocal, and illustrative cues, introduces a new dimension in collaborative learning. The AI agent, equipped with these multi-modal inputs, offers an adaptive and responsive learning platform. Haptic feedback provides learners with tangible reinforcement of concepts, enhancing their sense of presence and interaction, akin to collaborating with a real-life peer. Verbal dialogues enable learners to articulate queries, ideate, and share insights, while visual cues in the form of sketches or graphic representations aid in grasping abstract concepts, especially when reinforced by corresponding haptic feedback.

Embodied learning through integrated feedback mechanisms is a key feature. Empirical studies suggest that the nuanced incorporation of haptic feedback, especially when combined with visual representations, can significantly enhance comprehension of complex subjects. This multi-sensory approach, guided by the AI agent, ensures learners engage with content in a more immersive and meaningful manner, deepening their understanding and retention of concepts.

At the core of this pedagogical approach lies the concept of constructive knowledge formation with AI. The AI agent facilitates a dynamic learning environment by seamlessly integrating haptic, verbal, and visual feedback. This interactive and responsive learning journey, fostered by the AI's capabilities, ensures a deeper, lasting understanding of subjects.

AI-guided orchestration via haptic directives plays a crucial role in maintaining the learner's attention and flow throughout an activity. The concept of "Orchestration Graphs" provides a structural and pedagogical framework for learning activities across individual, group, and class levels. The AI agent can tactically steer the learner's hand to points of interest on the graph, emphasizing crucial junctures or pivots in the learning activity, thereby fostering a symbiotic collaboration between human and AI.

The invention also offers comprehensive learning assessment opportunities. The embedded AI agent starts learning alongside the user, employing various approaches like motor control through reinforcement learning or verbal communication. This iterative learning process enhances the AI agent's capabilities and its understanding of the user's preferences and requirements. Verbal communication and visual inputs further enhance the AI agent's knowledge acquisition, leading to comprehensive learning assessments based on interactions and feedback exchanged between the user and the AI agent.

In the realm of professional tools, especially advanced computer-aided design, the invention aims to revolutionize drawing by intertwining traditional techniques with CAD functionalities and AI-driven haptic feedback. It bridges the gap between manual and CAD drawing, leveraging AI's context-aware capabilities for a seamless, enriched design experience. The AI's contextual understanding in design brainstorming preempts the designer's trajectory, offering insights or tools that might be needed next.

As an assistive technology, the invention offers navigational guidance enhanced by AI interpretation, especially beneficial for individuals with impairments like vision or motor control. It also provides AI-driven assistance and therapy for motor control deficits, countering involuntary movements or amplifying user movements as needed.

Finally, the invention's application in social interaction with a robot buddy is particularly compelling. It enhances the personification of the companion, creating a sense of presence and engagement beyond what pure digital avatars can achieve. This opens up exciting possibilities for applications like language learning, storytelling, and emotional support, fostering deeper levels of engagement and facilitating meaningful social interactions.

The invention will now be described with reference to the accompanying drawings which should be regarded as merely illustrative without restricting the scope of the present invention.

Figure 1:
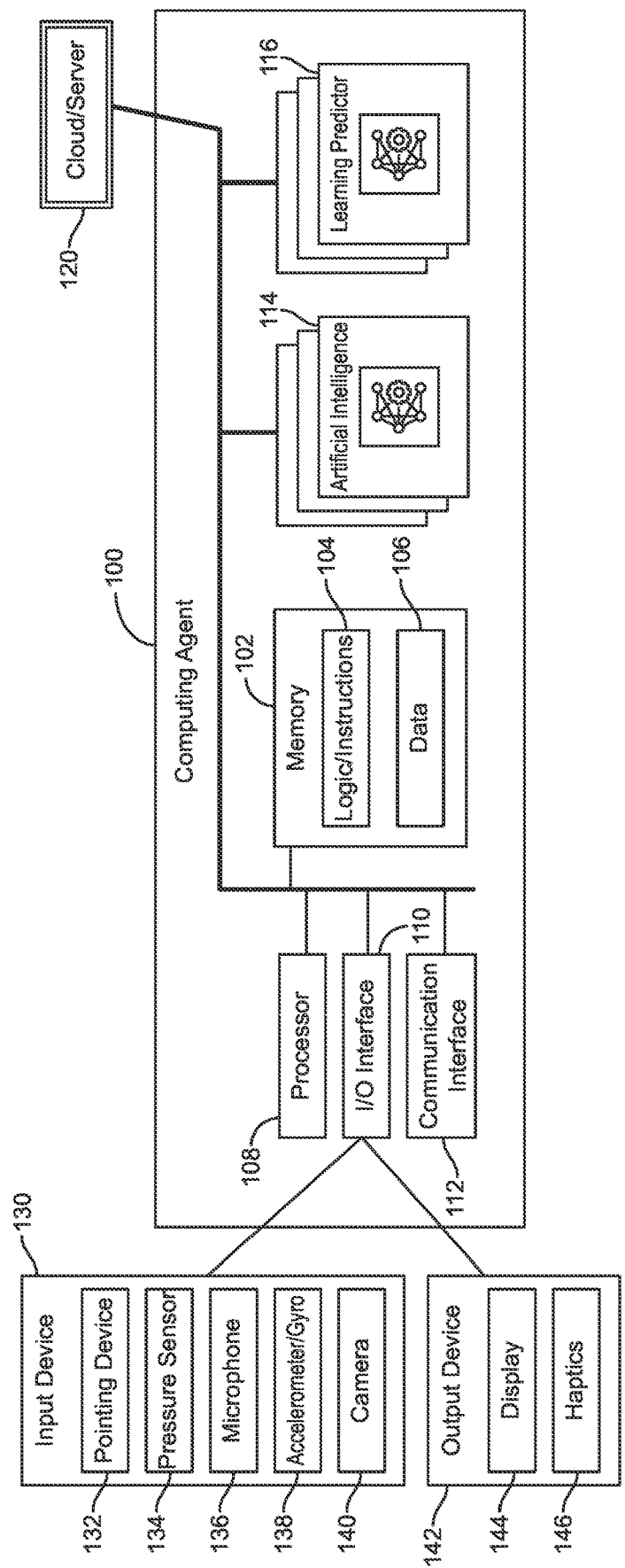

FIG. 1 is a block diagram illustrating a simplified example implementation of a computing agent 100 that is suitable for implementing embodiments described herein. Example of the present disclosure may be implemented in other computing systems, which may include components different from those discussed below. The computing agent 100 may be used to execute instructions and support multimodal interactions with a user. The computing agent system 100 includes at least one processor 108, such as a central processing unit, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof. Within the architecture of the computing agent system 100, there exists an input/output (I/O) interface 110, crafted to facilitate connections with various external devices, namely the input device 130 and the output device 142. The diverse repertoire of input devices encompasses pointing tools such as digital styluses, mice, trackpads, fingers, or trackballs. Expanding on this, the depicted input device 130 may incorporate various sensors and tools: a pressure sensor 134 (potentially situated at the grip or the contact point on a surface), a microphone 136, an accelerometer 138, a camera 140, and even capacitive sensors integrated into the device body. On the other side of the spectrum, the illustrated output device 142 encompasses a haptic feedback mechanism 146, potentially complemented by a display unit 144.

The computing agent system 100 may include an optional communications interface 112 for wired or wireless communication with other computing systems (e.g., other computing systems in a network). The communications interface 112 may include wired links (e.g., Ethernet cable) and/or wireless links (e.g., one or more antennas) for intra-network and/or inter-network communications. The example shown portrays a configuration where both the input device 130 and the output device 142 are external to the computing system 100. In this arrangement, the computing agent encompasses two distinct compartments that interface via the communication module 112. As an illustrative case, consider a digital pen equipped with haptic feedback capabilities and requisite sensing technology, paired with a tablet housing components like the processor and memory. Such components can seamlessly communicate via interfaces, such as Bluetooth or capacitive touch screen mechanisms. The computing system 100 is equipped with one or more memory units, collectively denoted as "memory 102". This memory can encompass both volatile types such as random-access memory (RAM) and non-volatile forms like flash memory and read-only memory (ROM). Serving as a repository for various software instructions, memory 102 not only retains the imperative commands for methods as described herein but also caters to other software functionalities like hosting an operating system (OS) and associated applications. Among the stored instructions 104, there are specific directives for facilitating force feedback via the haptic system and even for executing advanced pretrained machine learning algorithms. Additionally, the memory 102 maintains a database of other data 108, encompassing information, rules, policies, and a suite of machine-executable directives as detailed in this documentation.

The computing agent system 100, in certain embodiments, may encompass one or more electronic storage solutions. These can range from internal storage options like solid-state drives, hard disk drives, magnetic disk drives, and optical disk drives, to external solutions such as cloud storage. Additionally, there are instances where the data and instructions are furnished by an external memory, which can be in wired or wireless linkage with the computing system 100. Such data and instructions can reside on either transitory or non-transitory computer-readable mediums. Illustrative examples of non-transitory computer-readable media comprise RAM, ROM, EPROM, EEPROM, flash memory, CD-ROMs, and other forms of portable memory storage. It's worth noting that these storage mechanisms, together with memory 102, play a pivotal role in implementing the computing system 100's data storage, retrieval, and caching functionalities. For effective inter-component communication, elements of the computing system 100 may interconnect via a system bus or a similar conduit.

In specific embodiments, the computing agent system 100 is integrated with an artificial intelligence (AI) unit 114, which is purpose-built to foster a richer, more intuitive interaction with the user. Within the AI unit 114, there may be a multitude of sophisticated components tailored for various tasks:

1. Pre-trained Models: These models have undergone extensive training on vast datasets before being deployed. For instance, large language models can interpret and generate human-like text, making them invaluable for tasks such as chatbots, content creation, or natural language understanding.
2. Deep Reinforcement Learning Modules: Contrary to pre-trained models, deep reinforcement learning (DRL) modules allow the system to learn and adapt in real-time. Through a trial-and-error mechanism, the DRL modules continually refine their responses based on the feedback they receive, ensuring the system gets progressively better at catering to the unique preferences and needs of the user.
3. Online Learning Capabilities: These are designed to adapt and refine the AI's performance based on continuous interactions with the user. Unlike traditional models that remain static post their initial training, online learning ensures that the system remains dynamic, continually updating itself based on the latest data from user interactions.

Together, these components ensure that the computing agent system 100 not only offers a high degree of initial competence but also the capability to evolve and refine its interactions based on ongoing user engagement.

The computing agent encompasses a specialized learning predictor module 116, designed to be attuned to the user's unique interaction patterns. At its core, this module relies on an advanced artificial intelligence network, typically manifesting as a deep neural network. Contrary to many AI frameworks that leverage pre-trained models built on diverse datasets, the learning predictor module 116 is intentionally void of any pre-established models or parameters. Instead, it learns exclusively from the real-time, filtered data derived from interactions with a singular user—the device's owner.

The design philosophy behind this module is to align its understanding as closely as possible with the user's knowledge base. By capturing and learning from the nuances of one user's interaction patterns, the module aims to generate insights and predictions that resonate deeply with the user's learning style and knowledge framework. As the module matures through iterative interactions, it becomes a powerful tool for rapid assessments of the user's learning progression. This makes it invaluable for setting bespoke benchmarks, ensuring that educational or training interventions are always pitched at just the right level for the user.

Within the architecture of the computing agent system 100, certain compartments or modules may be designed to operate beyond the confines of the local hardware. These elements could either be transferred or have corresponding replicas residing on an external cloud/server unit 120. The motivation behind leveraging such external resources stems from several potential advantages:

Processing Power: The cloud/server unit 120 typically boasts a substantial computational capacity, making it an ideal choice for conducting intricate operations, especially the heavy computational lifting required for training sophisticated artificial intelligence models.

Storage Scalability: Given the expansive nature of datasets and the vast number of parameters associated with deep learning models, the cloud/server unit 120 offers scalable storage solutions, enabling the system to accommodate and manage increasing data volumes efficiently.

Flexibility in Operation Modes: The computing agent system 100 is designed to maintain communication with the cloud/server unit 120 in various operational modalities. It can function in synchronous modes, where tasks are performed in real-time coordination, or in asynchronous modes, allowing for deferred processing and greater operational flexibility.

Thus, by integrating with an external cloud/server unit 120, the computing agent system 100 can amplify its capabilities, ensuring optimal performance while catering to diverse computational and storage demands.

While FIG. 1 delineates a singular representation of each component, it should be noted that multiple instances of each component can be present within the computing system 100. Moreover, although depicted as a consolidated unit, the computing system 100 offers versatility in its physical manifestation. It might be embodied as an individual computing entity such as a solitary workstation, an end-user device, or a standalone server. Beyond these conventional forms, the computing system 100 also boasts adaptability to modern devices and contexts. Examples include, but are not limited to, mobile communication devices like smartphones, laptop computers, tablets, vehicle-based driver assistance systems, intelligent household appliances, wearable technology, and interactive kiosk systems. In certain scenarios, the computing system 100 may not be confined to a singular physical apparatus. It could span across a multitude of machines or devices, possibly manifesting as a cluster or an array of servers. Furthermore, with the advancements in virtualization technologies, the computing system 100 might exist as a virtualized computing framework. Such a system could be realized as a virtual machine or even a virtual server, simulated atop a cluster of tangible machines or within the expansive realms of a cloud computing infrastructure.

Figure 2:
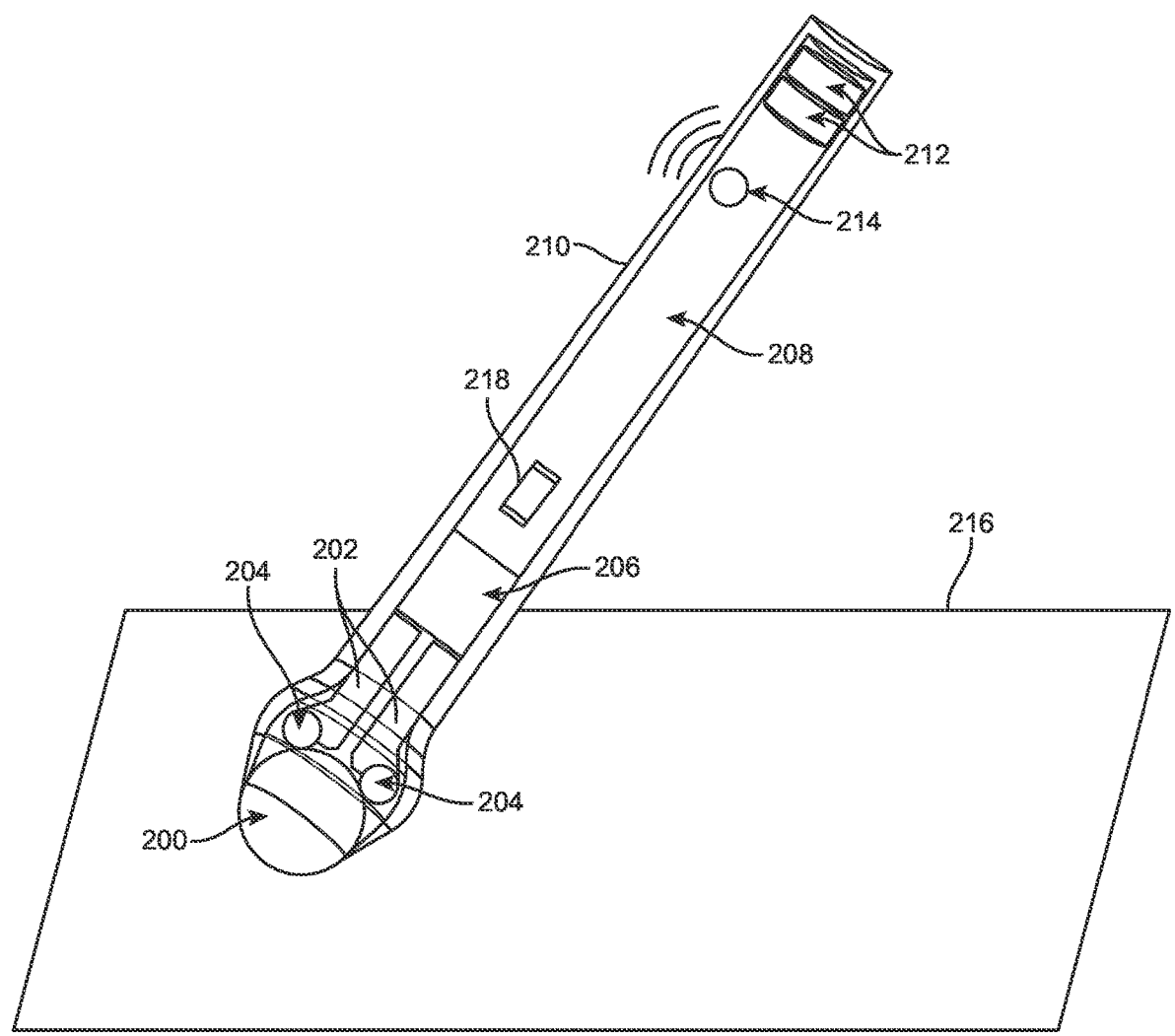

FIG. 2 showcases the foundational embodiment of the invention, specifically, a force feedback stylus that enhances user interaction. Central to its function is the surface-contact ball 200, designed to traverse a two-dimensional interaction surface 216. This distinctive feature of the stylus, frequently dubbed the ballpoint drive, employs a unique mechanism to produce tangible force feedback.

The primary objective of this feedback mechanism is to offer users dynamic guidance and resistance as the stylus maneuvers across any 2D surface. To achieve this, the stylus deploys a series of actuators, ensuring that the force feedback feels intuitive and responsive. Diving into the mechanics, the ballpoint drive utilizes a set of dedicated actuators 202. These actuators meticulously drive a series of rollers, termed drive rollers 204, which in turn propel the surface-contact ball 200. When the user applies even the slightest pressure, causing the surface-contact ball to press against the interaction surface, the friction engendered at this interface ensures the ball remains firmly in contact. This adherence or non-slip state instigates an interactive force which subsequently produces a mechanical torque, effectively offering resistance and guidance to the user's hand.

Augmenting the stylus's capabilities further is the integrated sensing unit 218. This unit is versatile, potentially housing a microphone for auditory inputs, an accelerometer to gauge movement dynamics, or even a camera for visual feedback or gesture recognition. Enhancing the tactile experience is a vibration engine 206. This could be a sophisticated component like a linear resonance actuator (LRA), finely tuned to produce varied haptic responses based on the user's interaction. For seamless connectivity with external devices or systems, the stylus incorporates a communication module 214. This module can support various communication standards such as Bluetooth for close-range interactions or Wi-Fi for broader connectivity. Powering all these intricate systems is the stylus's internal energy source 212, typically comprising batteries, ensuring prolonged, uninterrupted usage.

Figure 3:
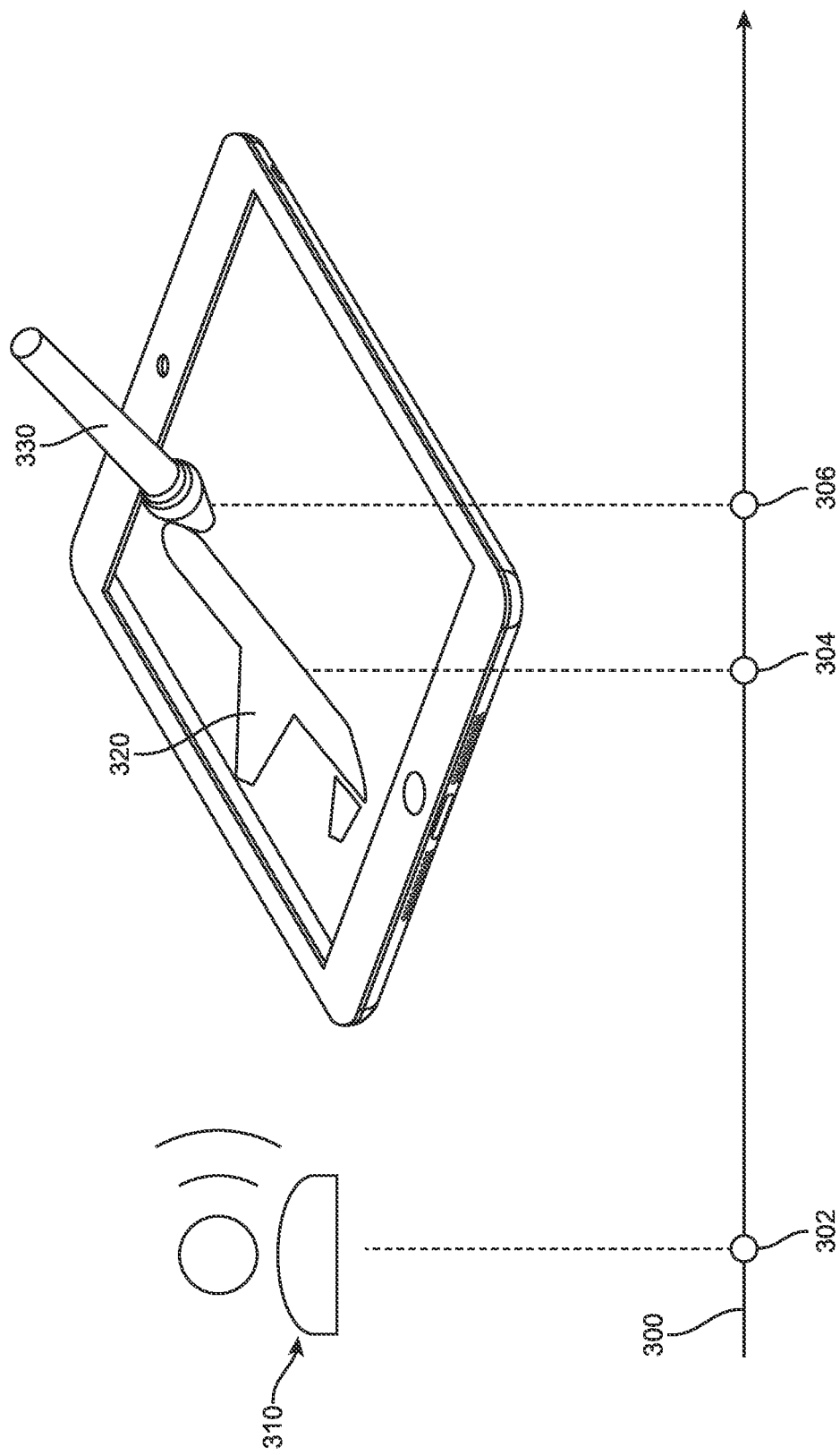
FIG. 3 depicts the haptic pen interacting with a touch-sensitive surface, exemplified by a tablet screen, in accordance with another embodiment of the present invention.

As depicted in FIG. 3, we present an exemplar embodiment that showcases the multifaceted interaction possibilities with the AI computing agent 300. This embodiment underscores a rich, immersive multimodal interaction that seamlessly integrates three core modalities: a speech signal 310, a visually engaging element or cue 320, and an intuitive force feedback mechanism 330. To illustrate, consider a scenario where a user's spoken command or utterance 302 instantly manifests a visual response on a display. This immediate visual feedback not only provides confirmation of the input but also sets the stage for further tactile interactions. Beyond mere visual output, the user can haptically interact 306 with the virtual object that now populates the display. Such an interaction transcends traditional touch interactions—the computing agent, through its intricate mechanisms, can apply a tangible force feedback, guiding or nudging the user's hand towards specific regions of interest on the display. Complementing this, the computing agent might also produce a corresponding auditory output, ensuring the user remains informed and engaged throughout the interaction. An intriguing aspect of this multimodal interaction lies in the computing agent's ability to orchestrate the progression of events based on user actions. It may tactfully pause the interaction, patiently awaiting the user's hand to be guided or dragged to a predetermined location. Only upon this action's completion would it then proceed with the consequent interaction phases. Drawing from a real-world analogy, if the topic of discussion is the mechanics of how an airplane soars, the computing agent might patiently wait as the user's stylus is drawn towards the visual representation of the airplane's engines. On reaching the destination, it would then delve into an informative exposition on the engine's role and functions.

Figure 4:
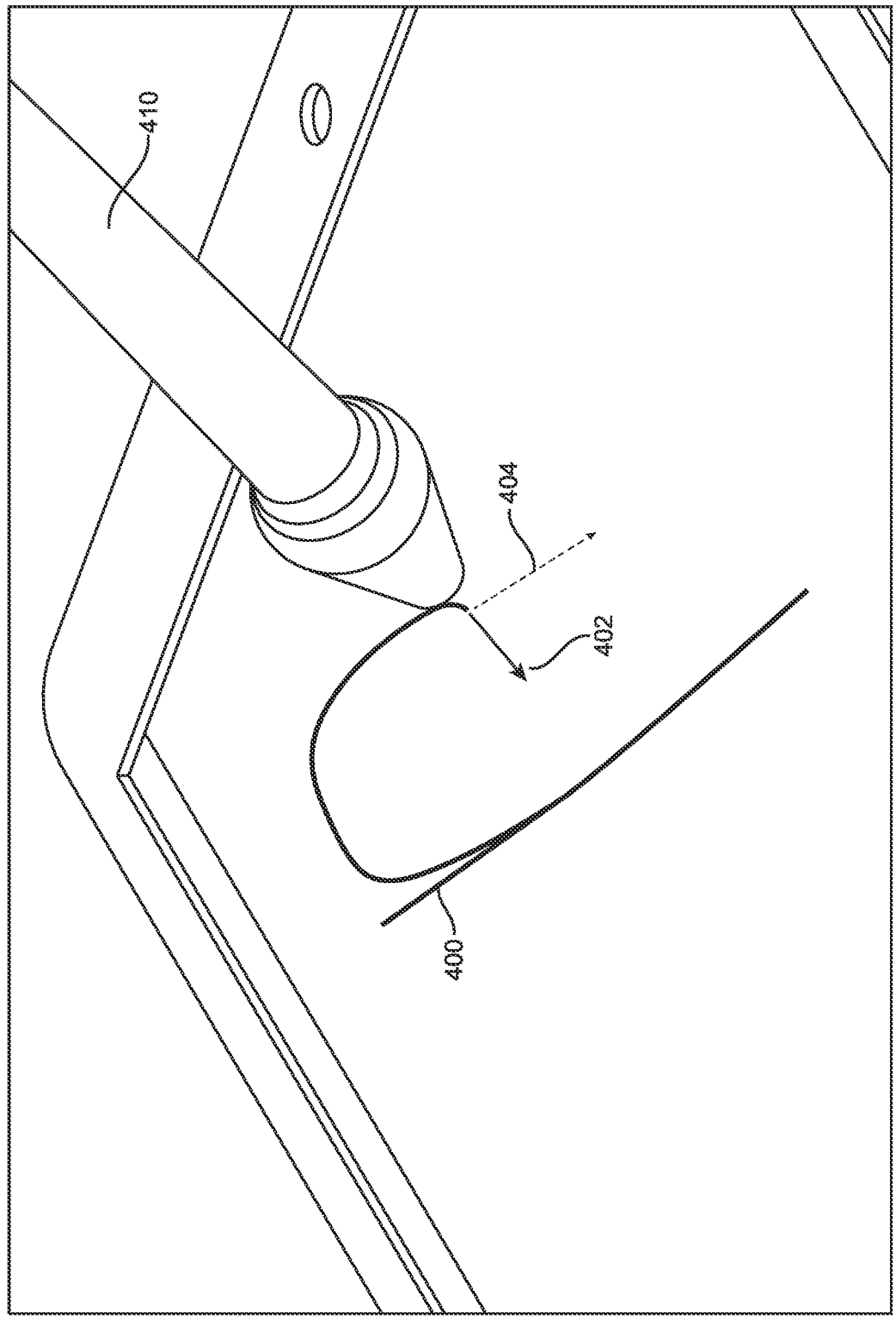
FIG. 4 illustrates a manner in which haptic interaction with the computing agent facilitates online learning for the learning predictor (116), in accordance with an embodiment of the present invention.

As depicted in FIG. 4, the illustration showcases the nuanced application of Reinforcement Learning (RL) meticulously designed for the 2D haptic pen drawing paradigm. Through the astute adoption of RL tenets, the haptic pen exhibits the capability to independently hone its force feedback responses. This not only enriches the user's drawing experience but also facilitates the pen's learning curve on drawing techniques directly from the user's interactions. The goal here is to culminate in a synergistic drawing collaboration, minimizing the effort required from the user. As a case in point, a user attempts to scribe the character "P" 400, wielding our state-of-the-art haptic stylus 410.

State Space: Central to the RL approach is the state space, representing the haptic pen's relative positioning to a predefined or desired drawing trajectory 404. Distinct states in this context can be categorized as:
  On-path: Signifying the pen's alignment with the desired trajectory 402.
  Near-path: Denoting proximity but not exact alignment with the trajectory.
  Off-path: Indicating a substantial deviation from the intended path 402.

Action Space: The action space enumerates the feasible movements the haptic pen might undertake. These actions encompass slight shifts to the left, right, upward, downward, or mere continuation in the extant direction. The granularity or precision of these movements is contingent on the intricacies and demands of the specific drawing undertaking.

Rewards: The reward mechanism is paramount in RL. A positive reward is conferred when the forces elicited by the haptic apparatus 404 resonate with the user's envisaged drawing trajectory 402. Conversely, any divergence or forces 404 in opposition to the user's trajectory 402 might yield diminished or even punitive rewards.

Context Vector for the C-MAB Learner: The feedback loop facilitated by the haptic pen is instrumental in fine-tuning its movements. The context vector, for example, could encapsulate parameters such as user-applied pressure or drawing velocity. This dynamic enables the system to preemptively adjust its forces in alignment with the user's actions.

Training of the State Classifier: An innovative aspect involves the autonomous labeling of the haptic pen's state (like "on-path" or "off-path") predicated on the embedded sensor data. Sophisticated algorithms stand poised to discern the pen's relative state juxtaposed against the user's aspirations.

Input Vector of Tactile Sensor Data: Integral sensors within the haptic pen discern nuances in its trajectory, pressure exertion, or relative positioning. These detected variances, once transformed into input vectors, empower the learning algorithm to evolve and calibrate the pen's trajectories. By placing an emphasis on the disparities in sensor feedback juxtaposed against prior states, the system augments its precision, delivering amplified force feedback, thus enhancing the user's drawing experience.

At its core, the overarching ambition is the cultivation of a haptic pen that seamlessly synchronizes its force feedback with the user's drawing inclinations. The symphony between the pen's sensory apparatus and the reinforcement learning algorithm strives to furnish the most organic and instinctive drawing experience conceivable.

As illustrated, the Learning Predictor Module 116 is configured to adaptively learn based on a user's haptic interactions. The primary function of this module is to optimize and minimize collaborative effort required during joint drawing tasks. This is achieved by dynamically adjusting feedback mechanisms in response to the user's input, allowing for a more intuitive and tailored experience. Additionally, while the module is adept at managing haptic feedback, it is equally competent in the auditory domain. When a user communicates verbally with the computing agent, the Learning Predictor Module 116 is further configured to assess and predict the user's knowledge level, adjusting its responses accordingly. This learning predictor further can be used to run assessments on the user's knowledge.

The linkage between drive rollers 204 and the contact ball 200 can be achieved through various mechanisms, including but not limited to friction or magnetic methods. Within the scope of this invention, a mechanical linkage is exemplified. Notwithstanding, the actuation configurations detailed herein may be applicable to both mechanical and magnetic transmission systems. The preferred embodiment of this invention incorporates a rotary actuator within its drive mechanism. Suitable technologies for this primary drive actuator encompass a range of advanced material actuators. This includes piezoelectric actuators, torsional shape memory alloys, and a variety of electrical motors such as core-less DC, brush-less DC, brushed DC, and stepper motors, among others.

In all configurations detailed below, a foundational principle is maintained: the surface contact ball's movement along the interaction surface aligns with a directional force feedback mechanism. This mechanism either guides or resists the user's hand motion. The various configurations provide different methodologies for realizing this principle.

Three Points of Contact Configuration: One embodiment features three contact points between the drive mechanism and the contact ball.

Dual Actuator Configuration—FIG. 5(A) depicts an arrangement utilizing two actuators and a third "tricycle" position anchored by a freewheeling ball, facilitating the stability of the surface contact ball. The device tip assembly—comprising actuators 202, drive rollers 204, and a surface-contact ball 200—connects to the stylus's main body via a slip ring. This connection permits free rotation in the a direction while facilitating electrical power transmission to the motors. By driving both actuators in uniform speed and direction, the stylus produces a torque on the user's hand in the u direction. If the direction of u diverges from the intended force vector, rotating the actuators in opposing directions adjusts the device's orientation in the a direction. This adjustment continues until the direction of u aligns with the intended force direction. An auxiliary precision actuator, positioned in the stylus's main body, could further enhance the tip's rotation accuracy. The actuators' angular placements around the surface contact ball influence various performance aspects, including directional force feedback, rapid powered rotation, and system back drivability.

Tri-Actuator Configuration—FIG. 5(B) showcases an arrangement using three omni-wheels, uniformly spaced at 120° around the contact ball's circumference. This configuration permits force generation in any 2D direction.

Challenges of the Three-Point Contact Configuration—The three-point connection inherently offers a reduced mechanical bond between the drive rollers and the contact ball, potentially causing the friction drive to slip. Some mitigating components, such as omni-wheels, offer potential solutions but introduce their own challenges. For instance, omni-wheels may induce additional vibrations due to their construction. Additionally, the three-point connection introduces nonholonomic constraints, complicating trajectory tracking and the measurement of the surface contact ball's motion.

Four Points of Contact Configuration:

Dual Actuator Arrangement-Referring to FIG. 6(A), each of the actuators 600 is configured to produce the requisite torque along a dedicated axis. Specifically, actuator-driven torque $\omega 1$ induces movement of the stylus in the u direction, while torque 2 drives movement in the v direction. In certain embodiments, one or a pair of spring-biased passive idler rollers 604 are positioned diametrically opposite each actuator, exerting pressure along the equatorial plane of the contact ball 600. This arrangement ensures sustained engagement between the actuator and the surface contact ball.

Limitations of the Dual Actuator Configuration—The implementation of a mere two actuators to regulate the rotation of the surface contact ball introduces certain challenges pertaining to precision. Specifically, due to the lack of symmetrical torque application across the surface contact ball's diametric axes, there is a propensity for the contact ball to exhibit unwanted translations within its housing, rather than executing a pure rolling motion. Such challenges necessitate the integration of an advanced suspension mechanism to stabilize the ball, thereby facilitating effective torque transmission from the actuator to the interacting surface.

Quadruple Actuator Configuration: The Preferred Embodiment—To attain optimal control and manipulation of the ball, an arrangement employing four actuators is favored. As depicted in FIG. 6(B), this configuration utilizes four actuators wherein each diametrically opposed actuator pair, namely 606 and 602, collaboratively applies a balanced torque onto the surface contact ball. This harmonized torque application primarily results in the desired rotational motion, effectively minimizing undesired translational ball movements.

For further clarity, FIG. 7 furnishes an in-depth perspective of a particular embodiment featuring the quadruple actuator configuration. In this instance, two actuator pairs, potentially comprising high torque density coreless motors 702, effectuate unidimensional movement. The accompanying gear train 704 augments the torque produced by actuators 702, transferring it to drive rollers 708 and subsequently, to the surface contact ball 700. Component 710, an optional pulley, presents an alternative means to couple roller 708 with actuators 702.

To securely position the surface contact ball within its designated compartment, a bearing system might be integrated. For the realization of seamless force feedback, it is imperative that the suspension apparatus of the contact ball be meticulously crafted. This ensures that the contact ball perpetually remains in operational engagement with the drivetrain, both to sustain uninterrupted traction and to absorb and minimize vibrations. As depicted in FIG. 9, diminutive bearings, labeled 910, are strategically situated within the housing, serving to keep the contact ball accurately aligned.

Furthermore, to modulate the frictional interplay between the actuators and the contact ball and/or the bearing ball (that is, to strike a balance wherein the friction is just sufficient to prevent slippage of the drive train, yet not excessively high to hamper fluid motion), mechanisms such as adjustable springs or a linear actuator, denoted as 912, can be positioned intermediary to the drive train and its barrel.

For the purpose of accomplishing unadulterated rolling contact with the designated interaction surface, thereby negating undesired skidding or slipping, the exterior of the contact ball is judiciously chosen. This ensures the efficient conveyance of reaction forces reciprocating between the user's appendage and a stationary anchor point. The drive rollers, to further amplify the fidelity of this contact, may be infused with a polymeric or elastomeric coating. Additional considerations include the incorporation of distinctive patterns, textures, or other innovative designs as referenced in FIG. 7, all aimed to bolster surface adhesion and augment grip on the contact ball.

A synergy between a cogwheel mechanism and a ball made of Neoprene rubber epitomizes a proficient mechanical interface linking the roller and the contact ball. The inclusion of diminutive cogwheel teeth ensures the fluidity of drive, consequently facilitating an unhindered, natural sensation during the rolling of the surface contact ball. While uniform cogwheel shapes can be adopted for both the gears that engage the actuator with the roller and the roller with the contact ball, one might also consider leveraging disparate cogwheel designs tailored to each individual mechanical liaison. To economize on the number of actuators deployed within the system, one might opt for a pulley-belt apparatus, designated as 710, serving to link diametrically opposing actuators.

Methodologies to Amplify Drive-Train Proficiency: To optimize the drive train's performance, it is imperative that it manifests the least resistance, for instance, from aspects such as rolling friction or any non-back drivability stemming from the actuator or transmission, especially when the actuation mechanism remains dormant. The impedance inherent to a drive train is multifaceted in origin. Herein, we delineate a plethora of methodologies, either stand-alone or amalgamated, designed to curtail this impedance. Although this documentation elucidates several methodologies, it remains open to other viable techniques not enumerated here.

Referring to FIG. 7, a prototypical drive system—encapsulating both the actuator and the torque transmission—might be exemplified by a motor unit 702 interfacing with a gearbox mechanism 710, concurrently collaborating with a drive roller 708 that establishes contact with the contact ball 700. Each specified roller, represented as 708, might be electronically synchronized with its diametrically opposing counterpart, leveraging electronic feedback cascading through motors 702. Alternatively, a mechanical congruence might be established utilizing mechanisms such as gears or the aforementioned pulley system 710. This intricate design serves a dual purpose: Primarily, it facilitates the actuators in dispensing balanced torques to the contact ball. Secondarily, it obviates the inadvertent uncontrolled rotation of any roller, particularly when the contact ball is inadvertently nudged and repositioned towards the opposite roller, a phenomenon induced by undue force applied by the end user. Nevertheless, with the overarching goal to economize on the total number of actuators within the drive system, a duet of actuators could effectively orchestrate the movement of all four rollers. This streamlined setup could harness mechanical conduits such as gears or the pulley-belt assembly to empower each actuator to govern a duo of rollers.

Optimization of Actuator-to-Ball Interaction: For an ideal interface between the actuator and the rubber ball, the interplay of ball rigidity and cog specification is pivotal. The synthesis of these two parameters can determine the efficiency and efficacy of torque transfer, as well as the perceived smoothness of the device's operation by the end user. Empirical observations have pinpointed certain combinations that yield enhanced performance outcomes. One such potent combination encapsulates a rubber ball, endowed with a tensile strength of approximately 144 MPa, interfacing with a metal gear characterized by a diametral pitch of precisely 187 teeth/inch. This amalgamation demonstrates a superior balance of torque transmission and operational smoothness. It's noteworthy that while this aforementioned combination has proven efficacious, the optimal configuration can be contingent on several factors including the intended application, the specificities of the user interaction, and the nuances of the design environment. Consequently, it's encouraged to continually iterate and experiment with varying combinations to discern the most suitable configuration for any given scenario.

To achieve a tactile feedback system that either guides the user's hand in a specific trajectory or effectively renders sensations of virtual environments, certain systematic steps are indispensable. These steps are vital to produce accurate and realistic haptic feedback, enhancing the immersion and user experience. The approach can be decomposed as follows: (1.) State Acquisition: This involves capturing the contact state to determine the user's current interaction with the device. Simultaneously, acquiring the internal kinematic state of the device and assessing the 3D orientation form an integral part of this step. (2.) Position Determination: To understand the point of interaction on the device's surface, it's pivotal to measure the 2D surface-contact position. This measurement can be derived from a plethora of methodologies, encompassing both external and internal mechanisms. (3.) Kinematic Processing: Here, the primary objective is to amplify and filter the positional measurements. By differentiating the position, a 2D velocity estimate is obtained. This information is then funneled through a forward kinematic model, ensuring an accurate representation of the device's movement. (4.) Trajectory Alignment: The primary task here is to monitor the user's current trajectory and match it with a predefined or desired path, especially in contexts where the motion needs to be guided. This involves generating torque commands, factoring in the discrepancies between the desired trajectory (often stemming from a virtual environment or another predetermined source) and the actual trajectory followed by the user. (5.) Virtual Feedback Rendering: This stage entails generating force feedback in the context of a virtual environment. The procedure involves detecting collisions with elements within the virtual realm, evaluating the depth of such interferences, and subsequently calculating the resulting force from such interactions. The virtual environment's force is then mathematically transformed, relying on inverse kinematics, into specific parameters (FS and VS). Subsequently, based on a pre-established voltage constant, appropriate force commands are dispatched to the corresponding actuator pairs.

In essence, by meticulously following these steps, the device can seamlessly produce an intuitive and accurate force feedback, greatly augmenting the tactile experience for the user. This content extends on your initial description, aiming to provide clarity and adding depth to each stage of the process. It's essential to adjust and tailor the information to ensure alignment with specific project requirements and technicalities.

In haptic devices, the braking mechanism serves as an indispensable tool, especially when trying to mimic certain tactile feedback features such as virtual walls, resistances, and other fixed elements in the user's interactive environment. The underlying principle of braking in this context is the creation of an energetically passive scenario, thus ensuring stability. The braking functionality, though passive, should not be mistaken as a secondary or less critical feature. Instead, it holds a paramount role in realizing the entire haptic experience.

A nuanced understanding of the device's structure and configuration is vital to effectuate the optimal braking effect. In the described invention, efficient braking can be visualized through the following mechanism:

- In configurations involving multiple rollers, such as a 4-roller setup, the rollers are coordinated to rotate inwards simultaneously. This collective movement drives the contact ball in the direction of the trackball sensor, denoted as 706. When this movement is well-coordinated, especially with at least one pair of opposing rollers, it results in the contact ball being actively trapped or jammed at four distinct points: the interaction surface, the trackball sensor 706, and the two rollers.
- For configurations with a lesser number of rollers, like a 3-roller setup, a similar principle applies, but the dynamics may vary slightly based on the design specifics.
- This strategic jamming of the contact ball can be utilized to emulate virtual constraints, reminiscent of the Cobot-like functionalities.
- Conversely, when the rollers are oriented to rotate outwards, the device still achieves braking but without the jamming effect. This configuration may result in a braking effect that's less pronounced, offering a different tactile sensation to the user.

In summation, by modulating the direction and coordination of the rollers, various braking effects can be rendered, each offering a distinct tactile experience. The choice of braking effect would depend on the haptic feedback desired for the specific application or scenario at hand.

The inclusion of the Linear Resonance Actuator (LRA) 206 in the robotic stylus system adds an array of possibilities to the tactile feedback domain. The LRA's design allows for intricate modulation of vibrotactile stimuli, offering users a wide spectrum of virtual tactile sensations. This is particularly significant when recreating the sensation of engaging with varying textures or materials. Moreover, beyond mere tactile feedback from physical or virtual interactions, the LRA's dynamic range can be employed to deliver emotive cues. Variations in vibration patterns, for instance, could be programmed to emulate various moods or feelings, further enhancing the user's interactive experience. Such tactile expressions are invaluable in fostering a deeper emotional resonance between the user and the robotic stylus companion. By actively integrating the LRA into the stylus system, the boundary between the virtual and tangible realm is blurred. The enhanced tactile feedback not only elevates the user's experience with the digital content but also augments the overall interactivity of the robotic stylus companion.

Another intriguing aspect of the robotic stylus system is its ability to produce vibrotactile feedback through its roller coordination. Specifically, when the rollers are coordinated to turn outward, they generate a distinct braking effect. However, if these rollers rapidly alternate their movement direction in a push-pull manner, it results in the surface contact ball exhibiting up-down vibrations. This phenomenon can be employed strategically for texture rendering, wherein specific vibrational patterns mimic different tactile textures or surfaces. To further enhance the vibrotactile capabilities of the stylus, integrating additional vibrotactile transducers, such as voice coils, eccentric rotating masses, or other linear resonant actuators, can be considered. Embedding these into the device's housing or handle can supplement the primary vibrotactile feedback with higher-frequency vibrations. Moreover, these transducers can work independently of the force drive mechanism, allowing the robotic stylus system to render both force feedback and vibrations without one compromising the other.

To accomplish various essential or optional control functions, the invention's controller requires several types of sensed data, listed below.

- Acoustic Sensing: Capture of sound waves via a microphone embedded within the device. This functionality can be useful for various purposes, such as recording user feedback or instructions, providing an auditory mode of interaction between the user and the device, or detecting surface differences through sound produced during interactions.
- Visual Sensing: Utilization of a camera to capture visual data from the environment or the interaction surface. This could aid in optical recognition tasks, facilitate augmented reality interactions, or detect specific marks or features on the interaction surface to enhance functionality.
- Motion Sensing: Through an embedded accelerometer, the device can track its movements in space. This provides data related to the device's acceleration, tilt, shake, or other dynamic changes in position or orientation. The data can be crucial for applications requiring gesture recognition, analyzing the dynamics of user interaction, or for establishing safety mechanisms where sudden, unintended movements can be flagged.

The first three relate to the device's tip contact position (a point on the surface contact ball) relative to the interaction surface. Most practical applications will require a global estimate of this quantity in order to interact with content. However, similarly to a conventional mouse, tip position in normal usage will likely be characterized by temporal contact gaps, where the user lifts the device from one point and later replaces it in another location. Thus, tip position estimates are defined only when the tip is in contact. We define these as contact periods. There are various possible ways of sensing each quantity, even using technology immediately available today, either by sensing the quantity directly, or by inferring it from internal measured quantities. In the following we will first give several examples of relevant quantities that can be sensed, and then give examples of ways that localization, relative position, orientation, and contact can be estimated from these quantities. Neither set of examples should be considered as a complete list. We present the sensed quantities along one or a set of examples of sensing configurations.

The disclosed invention contemplates various sensed quantities, enumerated as follows:

- Contact State: A binary indicator that ascertains whether the device tip is in active contact with the interaction surface. This state is instrumental in generating force feedback, facilitated by the frictional interaction between the device tip and said interaction surface.
- Localization on Interaction Surface: Denotes the unambiguous x-y positional coordinates of the stylus tip on the interaction surface vis-à-vis interaction content. This value is pertinent exclusively when the tip establishes contact with the interaction surface, otherwise defined within the context of a contact period.
- Device's Internal Kinematic Status: Represents the kinematic attributes of intrinsic device drive train components, such as contact rollers and the surface contact ball. These parameters are integral to sustain a dynamic representation of the device, instrumental for proficient motion and torque modulation.

Stylus Handle Orientation: Specifies the roll, pitch, and yaw of the stylus relative to the interaction surface. This metric is pivotal to deliver accurate force feedback, regardless of the stylus's positional orientation.

Applied Pressure Metric: Gauges the intensity of pressure exerted by the user either via the surface contact ball, as found in the fundamental embodiment, or via the drawing pen's apex in the pen-holder configuration, or potentially a fusion of the two.

The invention detects surface contact employing an integrated force-sensitive switch found within sensing trackball 706, as referenced in FIG. 7. Alternatively, this contact detection can be accomplished via a pressure-sensitive mechanism capable of quantifying the pressure meted out on the surface contact ball or the pen's tip. Specific embodiments, for instance, the pen-holder embodiment 10.2 or the mouse embodiment 10.4, may deploy optical sensors to discern this contact.

Touch-sensitive Interactive Interfaces—A method for achieving precise localization involves touch-responsive interfaces, such as intelligent boards or tables. Smaller movement interactions benefit particularly from devices like tablets. As depicted in FIG. 3, the force-feedback stylus interfaces with a graphical tablet display. Within this setup, the stylus interfaces with the host graphic display's control unit. This interaction discerns the position of the stylus tip relative to the displayed content via embedded tactile sensors within the display. The inherent controller of the stylus uses this discerned data as input, formulating the requisite force command to instruct the actuators. Such tactile surface methodologies offer the benefits of immediate deployment, pinpoint localization accuracy, and integration with graphical representation. However, constraints emerge when the interactive surface has a restricted dimension or positioning. This confines interactions, potentially nullifying some advantages of the disclosed invention, notably large-motion force feedback and the analog feel of pen-on-paper. Yet, if the interactive surface boasts high mobility, as observed with tablets, some limitations are counteracted, making this configuration suitable for certain applications.

Device-centric Optical Position Sensing—The technological foundation of a typical computer mouse can be harnessed to achieve simple yet effective device-centric position sensing. Illustrated in FIG. 11, the optical mouse sensor 901 can detect relative device movements with high fidelity. This optical system, comprising a swift integrated micro camera, can translate reflected light from a surface into relative directional changes. An optimal configuration places the optical head proximal to the pen-tip. Even when the contact ball experiences slippage, the optical encoder's measurements remain unaffected. While showcased for a mouse design, this modality can extend to other embodiments.

Optical Microdot Pattern Detection on Patterned Paper—Referring to FIGS. 12(A) and 12(B), an embedded optical microdot pattern detector 1208 can decipher a watermarked paper 1206, determining the absolute position of the stylus upon it.

Dead-reckoning Technique—The surface position can be approximated relative to a reference point on the interaction platform within the current contact period. For instance, from the device tip's point of contact. This approximation is achieved by monitoring the rotations of intrinsic device components, specifically the surface contact ball, thereby determining the x-y distance traversed on the surface from the reference. While this method avoids external sensors, integrating it with another technique might be necessary to connect the reference to a global coordinate system.

Remote Sensing Techniques—For expansive surfaces, the location of the device tip can be discerned remotely through methodologies such as computational vision systems, referenced in FIG. 15, or ultrasonic sensing modalities. For maximal mobility, the camera could be integrated into the device or worn by the user, for instance, AR/VR eyewear. Alternatively, for enhanced stability and accuracy, the sensing mechanism could be strategically positioned concerning the interaction surface. While being technologically intricate, this remote sensing technique might offer the most flexibility and application range.

As portrayed in FIG. 2, the drive train embodies various components configured in both series and parallel arrangements. The motion dynamics of each component can be precisely gauged or extrapolated from preceding or succeeding elements in the sequence. Incorporating inertial considerations and factors accounting for energy losses, the operational behavior of the system can be reliably modeled and predicted.

Such a model is critical for: (a) inferring position relative to a specific datum on the interaction platform via a dead-reckoning methodology, achieved by continuously observing the roll direction and magnitude of the surface contact sphere; and (b) enhancing the regulation and insight of the force-feedback presentation mechanism. In pursuit of these objectives: (1.) Each actuator within the drive train, specifically 202, 204, and 200, may encompass sensors that measure position or angular displacements, such as optical encoders. (2.) The sensing assembly 706, as illustrated in FIG. 7, can directly ascertain both the direction and the extent of the rotation exhibited by the surface contact sphere (further detailed subsequently). (3.) Localization data at the macro-scale can be integrated into the state blueprint.

A designated control unit, 208, consolidates data from the assorted sensors, refreshing and maintaining a system state blueprint. Utilizing this blueprint, the controller formulates actuator directives that produce contact torque consistent with the virtual model in interaction.

Surveillance of Contact Sphere Kinematics—As seen in FIG. 7, a miniaturized trackball mechanism, 706, is employed to detect the motion dynamics of its larger counterpart, the surface contact ball, in every possible direction of roll. This data is then relayed to the central controller. This miniaturized trackball can be based on either mechanical or optical modalities. For illustrative purposes, the mechanical input method used by Blackberry™ portable devices can be considered. When the surface contact ball actuates the miniaturized trackball mechanically, the motion is translated to a quartet of spindles, each embedded with magnetic elements. Each of these spindles is activated and subjected to rotation as the miniaturized trackball navigates along its two primary axes. This spindle rotation, in turn, initiates electronic pulse sequences by activating a comparator housed within a Hall Effect sensor. By counting these pulses, the rotations of both the miniaturized and surface contact balls can be precisely gauged, ensuring high-resolution displacement data at the rolling surface contact's precise point.

Capacitive Sensing for Stylus Orientation—Modern tablets have capacitive touchscreens that can detect minute changes in electrical fields. When a stylus interacts with such screens, it disrupts the uniform electric field generated by the capacitive layer. This disruption is recorded by the tablet as a series of capacitive data points. By examining the distribution and intensity of these data points, the tablet can infer not only the position of the stylus but also its orientation with respect to the screen. This is achieved through multiple touch receptors spread across the screen, which triangulate the orientation of the stylus based on capacitive data differentials. Such a method provides an efficient, low-latency mechanism for determining the stylus's orientation, enhancing the interaction precision, and enriching the user experience in graphic design, note-taking, and other tablet-based applications.

Hand movements, while engaging with the device, may cause alterations in the orientation of the stylus. Such shifts can change the relationship between the point of contact on the rolling surface ball and the interaction surface. In scenarios where the stylus isn't in a perfectly vertical position, the point of contact might differ from the stylus' axis, as demonstrated in FIGS. 8(A) and 8(B). This means that the velocities ascertained through trackball 706 (FIG. 7) or other mechanisms used to gauge the surface contact ball's movement might not offer an accurate tracking of the reference path Pt on the surface. The same discrepancy can lead to inaccuracies while producing control commands for guidance. Global localization signals might sometimes compensate for this, but often they might be temporally inadequate or suffer from spatial inaccuracies. Hence, it's advantageous to have an estimate of surface velocity that takes the device's orientation into account.

Definition of Stylus Orientation—The orientation of the ballpoint device can be comprehensively defined by [xd,yd, $\Theta S,\alpha d,\beta d$], where xS,yS pinpoints the contact point on the consistently mapped 2D surface within the coordinate frame S (FIGS. 8(A) and 8(B)). The other parameters include the device's roll around the surface's normal ($\Theta S$), its pitch ($\alpha d$), and yaw ($\beta d$) in relation to the device base d. Orientation details are crucial for countering the offset challenges, especially for our pen holder configuration. But its primary utility lies in velocity compensation.

Techniques to Sense Stylus Orientation—Multiple methods are available to sense the orientation of the stylus. Two prominent approaches include: (a) Utilizing a combination of accelerometer, magnetometer, and gyroscope data, which are processed in low-cost three-axis roll/pitch/yaw modules. Such units provide orientation output in Euler coordinates, which is a methodology adopted in commercial orientation sensors. (b) Decoding a camera vision stream in real-time from a camera aimed at a watermarked paper. In this setup, the stylus' orientation is determined by analyzing the position and scale of the watermarks with respect to the camera, which remains fixed on the device shaft.

Orientation Actuation—Actuating the orientation components such as $\Theta S$, $\alpha d$, or $\beta d$ (representing pitch, roll, and yaw of the stylus axis) is technically feasible but introduces complexity. While there are potential applications where an actuated roll is beneficial, for most scenarios, allowing the orientation to remain passive from the device's perspective grants users the freedom to choose a comfortable angle. This avoids introducing any forced torque on the wrist, which might be perceived as unnatural.

The disclosed stylus device comprises means for actuation utilizing commanded forces which are applied onto a surface contact ball. This mechanism allows the ball to traverse the interaction surface in directions xd,yd, differentiated from axis roll angle $\Theta S$.

Means for Unresisted Movement—The proposed invention employs voltage-controlled, opposing-pair drive rollers. When the apparatus moves free of external resistance, the aforementioned forces are approximately proportional to the device-relative velocity outputs. Herein, the surface velocity is computed from the device-relative ball velocity using the ballpoint drive's inverse kinematics. The computation takes into consideration the roll, pitch, and yaw, which are defined by the stylus orientation:

$$\begin{Bmatrix} V_x^d \\ V_y^d \end{Bmatrix} = R(-\Theta_s)Y(\alpha_d)^{-1}P(\beta_d)^{-1}\begin{Bmatrix} V_x^S \\ V_y^S \end{Bmatrix}, \quad (1)$$

$$R(\Theta) = \begin{Bmatrix} \cos(\Theta_s) & -\sin(\Theta_s) \\ \sin(\Theta_s) & \cos(\Theta_s) \end{Bmatrix} \quad (2)$$

$$Y(\alpha) = \begin{Bmatrix} \cos(\alpha)_d & 0 \\ 0 & 1 \end{Bmatrix} \quad (3)$$

$$P(\beta) = \begin{Bmatrix} 1 & 0 \\ 0 & \cos(\beta_d) \end{Bmatrix} \quad (4)$$

where the equations are defined as:

$R(\Theta S)$ is designed to account for user wrist rotation (spin), while $Y(\alpha d)$ and $P(\beta d)$ cater to the adjustments for grip-induced stylus tilt in yaw and pitch orientations.

Means for Self-driven Movement Computation—The invention utilizes a feature where, as demonstrated in FIGS. 8(A) and 8(B), any lateral tilt in the yaw of the stylus causes the surface contact point to diverge from the rolling surface contact ball's southernmost point. The surface-contact ball's rolling motion is described by path Pt, which represents a smaller circumference derived from the cosine functions of $\alpha d$ and $\beta d$. The stylus tip velocity at a point t on path Pt is defined as:

$$\frac{V_x^S}{V_y^S} = \frac{g_x^p}{g_y^p}, \quad (5)$$

The relation ensures that the top velocity remains constant irrespective of the (x, y) direction:

$$\sqrt{\left(V_x^S\right)^2 + \left(V_y^S\right)^2} = V_{x,max}^S. \quad (6)$$

Means for User-Resisted Movement Computation—In embodiments where the user presents resistance, or where other dynamics interfere with the movement, the stylus comprises a digital controller, housed within a processing unit. This controller calculates the deviation between the trajectory velocity and the estimated stylus velocity, producing a control output sent to the drive train. Additionally, a secondary control loop utilizing the stylus's absolute position can be used to correct any persisting discrepancies between the reference path pt and the stylus's actual position.

Apparatus and Method for Sensing Contact Force—In several disclosed embodiments, the contact force refers to the normal force exerted between the surface contact ball and the interaction surface. This force is particularly advantageous for low-level control operations. The disclosed device specifies an optimal range for the contact force, as determined by the user's application. By measuring this force, the device can provide feedback when the exerted force by the user on the stylus either surpasses or falls short of the ideal range for activating the friction drive. Additionally, such measurements are instrumental in differentiating between contact and non-contact states, allowing for deactivation of the drive train when the stylus is lifted off the interaction surface.

Contact Force Sensing in Pen-Holder Embodiment—In the pen-holder embodiment, there can sometimes be dual points of contact on the interaction surface: the surface-contact ball and the pen tip. Ideally, from a control perspective, force should be detected at both these points. The difference in force at these two locations holds significant value because: (a) occasionally, only one might be in contact (e.g., when the pen is lifted) and (b) the balance of forces can facilitate refined shared-control operations.

Two alternative methods involve sensing the force either at the drawing pen tip or at the surface contact ball. Both methods offer unique benefits: sensing at the pen tip can emulate traditional pen-on-paper interactions, while sensing at the surface contact ball might offer superior control over force feedback mechanisms. This is primarily because it aligns more closely with the force drive train and also due to the unavailability of pen tip feedback when the pen is raised, restricting the stylus to a force-feedback display or exploration mode instead of drawing. Sensing the contact force pressure from the drawing pen's tip is more favorable, echoing the tactile familiarity of pen and paper interactions.

Mechanisms for Sensing Contact Force—The invention incorporates an array of force sensors designed to quantify the force exerted by the user either on the surface contact ball (in the basic embodiment) or on the drawing pen's tip. Suitable sensors include force resistive sensors (FSR), strain gauges, and load cells. For the standard stylus embodiment, an exemplary location for installing the force sensor is beneath the sensing trackball 706, as illustrated in FIG. 7.

Housing and User Comfort Considerations

The grip of the stylus provides a marked improvement over traditional mouse grip. The design is both intuitive and offers enhanced dexterity, aiding drawing and stroking actions while also heightening the user's tactile feedback from guiding forces. Moreover, the ergonomic design of the stylus necessitates significantly reduced drive forces compared to typical mouse devices. The unique ability of the ball drive to tilt—achieving prototype angles ranging between 25-30° off from the surface normal—ensures that the force exerted by the user seldom aligns with the surface's perpendicular axis. In employing the stylus grip, users intuitively adjust to maintain an optimal tilt angle, contributing to the physical act of moving the device. This natural adaptability often results in users allowing the stylus to guide their movements, contrasting the static nature of mouse usage where the hand and forearm typically rest on the device, increasing the inertia that the drive mechanism needs to counteract. These distinctions are most pronounced in comparison with a mouse used on a horizontal surface but are also relevant in vertical orientations. As shown in FIG. 2, the pen barrel 210 serves as a protective housing for the internal components and is shaped to provide an ergonomic grip. While it can be constructed rigidly, there's potential for an adaptive design using flexible materials. This elasticity would allow the barrel to bend during force feedback interactions, ensuring that excessive force isn't exerted on the actuation components, including the gears and motors.

Achieving a compact form, especially along the entire length of the stylus, is imperative to enhance user comfort, increase device portability, and minimize any visual interference with the contact surface.

Overall Compactness—The primary component contributing to the device's size is the tip, designed to enclose the ball drive around the surface contact ball's perimeter. However, the diameters attainable are considerably smaller than those seen in traditional mouse-grip devices, as evidenced by prior works, making it well-suited for a stylus form factor. Notably, laboratory prototypes have demonstrated diameters approximately 38 mm. This has been achieved by incorporating high torque density motors in the drive mechanism, their optimal arrangement, and the employment of a singular surface contact ball (in contrast to the trio observed in mouse-grip devices).

Implementation of a Smaller Additional Contact Ball to Address Occlusion Issues—As illustrated in FIG. 9, the design may incorporate one or multiple intermediary contact balls 902, positioned between the primary surface-contact ball 900 and the drive rollers 906. In the depicted configuration, a prominent intermediary ball 902 enhances mechanical (for instance, frictional) engagement with drive rollers 906, subsequently transmitting the mechanical energy from actuators 908 to the contact ball 902. The design further condenses the stylus by drawing the drive rollers proximal to the shaft's axis. The intermediary ball 902 is securely contained within the housing 904 via a holding system 910. Examples of such systems include ball bearings (as showcased), magnetic levitation bearings, or alternative low friction holding mechanisms. This refined design endows the stylus tip with heightened precision, subsequently minimizing visual interference at the immediate interaction point.

Optical Clarity of Components—To further address potential visual obstructions, the structural components of the stylus tip, encompassing the surface contact ball, the bearing ball, and the casing, can be manufactured from transparent materials.

Incorporation of Light Indicators for Interaction Point Demarcation—A light emitter or projector can be integrated into the stylus to delineate the precise point of interaction or to project a dynamic representation on the interaction surface. Beyond the foundational force feedback conveyed to the user's hand via the ballpoint drive, linear tactile sensations—or their simulations—can be facilitated through various methods. For instance, localized linear actuations along the stylus's shaft beneath the user's fingers or supporting hand segments can be employed. While such techniques might have been utilized independently in prior designs, herein we detail their integration to complement the primary force feedback, thereby expanding its range of expressive capabilities.

Referencing FIGS. 10(A) and 10(B), two exemplary designs that incorporate embedded linear actuators—distinct from the primary drive actuators—are illustrated. These designs facilitate movement aligned with the stylus's longitudinal axis, projecting towards the drawing plane. In the configuration presented in FIG. 10(A), the movement generated via the linear actuator 1002 is relayed to the user's hand through the mobile casing 1004. This design choice engenders a user perception of forces in the z-direction, reminiscent of earlier works. An alternative mechanism, as depicted in FIG. 10(B), employs shear stresses. Herein, torque is delivered via actuators 1008 (for instance, skin-stretch actuators) onto the user's fingertips 1006. This approach evokes an illusion of force feedback, simulating attributes like gravitational pull or the softness of the surface under interaction. Such a technique, as a standalone actuation mechanism, has been explored in other devices. For optimal tactile feedback reception in the discussed scenarios, users are advised to maintain a light yet firm grip on the stylus. This measure aims to counteract inadvertent stalling, which might arise from undue pressure applied by the user onto the device. Excessive force can lead to heightened compression of the ball, thereby hindering the drive's operational efficiency. Such tactile feedback about the grip proves advantageous, assisting users in modulating their grip strength to levels that maximize the device's performance.

The quest for a truly portable and untethered haptic stylus necessitates an efficient power management system. Incorporating a battery 212 as the device's primary power source allows for enhanced mobility. It is pivotal to ensure that the battery chosen offers an optimal balance between longevity and weight to avoid burdening the user with excessive stylus heft. Advanced power management circuits could be integrated to enhance the battery life. Techniques such as dynamic power adjustment—wherein power consumption is tailored according to the stylus's operational demands—can be beneficial. Furthermore, energy-efficient components, as well as algorithms optimized for reduced computational requirements, could be implemented to prolong usage intervals between battery recharges or replacements.

To preserve the stylus's mobility and ensure unhindered interaction, the device should ideally avoid any physical connection to the host computer. Transitioning from a tethered to a wireless communication paradigm not only enhances portability but also elevates the user experience by removing the constraints and inconveniences posed by cables. A built-in wireless receiver, such as Bluetooth module 214, can provide seamless connectivity to a host computer or other compatible devices. Advanced wireless protocols could be considered to minimize latency, ensuring real-time responsiveness crucial for haptic feedback applications. The integration of modern wireless standards can also enhance the range, allowing users to interact from a considerable distance. For scenarios where wireless interference or congestion becomes a concern, the device can be equipped with capabilities to switch between multiple channels or frequencies. An auto-reconnect feature can ensure that any temporary disconnections are promptly resolved without requiring user intervention. Lastly, to support the untethered vision, a dedicated onboard microcontroller could be incorporated to process inputs locally, reducing the reliance on the host computer and potentially mitigating the need for constant communication.

The disclosed invention, including its system-level variations (e.g., pertaining to sensing methods, directional control, and the like) as detailed previously, may be realized in numerous configurations to cater to diverse applications.

A fundamental configuration of the disclosed invention is the stylus (FIGS. 5(A) and 5(B)). Through a stylus or pen grasp, users are configured to perceive a directional force. This force is enabled by the rolling contact between the driven surface-contact ball, positioned at the device's tip, and any 2D surface that exhibits minimal surface friction. This configuration allows haptic rendition of dynamic 2D virtual entities, including but not limited to, constraints, textures, detents, physical properties, and other abstractions.

The fundamental stylus configuration may be adaptably attached to drawing implements, such as pencils or whiteboard markers, or even a user's pointing finger. This embodiment necessitates added sensing measures to account for the pressure exerted on the drawing implement's tip and/or from the surface contact ball. Furthermore, to facilitate fine drawing with the embedded pen-like entity, velocity compensation is introduced with orientation sensing. For illustrative purposes, FIGS. 12(A) and 12(B) portray an example wherein a retractable pen holder 1202 is affixed to the ballpoint drive apparatus. Here, a user is configured to insert any pen-shaped object into 1202, for instance, a pen 1204. Absolute position determination of the pen's contact point can leverage various methodologies, one of which incorporates a watermarked paper 1206 in tandem with a camera 1208. In an embodiment exemplifying the present invention, as depicted in FIGS. 13(A) and 13(B), a particular configuration showcases a digital pen, designated as 1308, securely attached to the ballpoint drive mechanism, labeled as 1306. In this instantiation, the visual component, or display, represented by 1302, serves the dual purpose of presenting a humanoid robot facial representation, possibly delineated by features such as two discernible eyes, or it can be employed to illustrate minute details, further augmenting the interactive experience. Encasing and functioning as the protective shell, the body, annotated as 1304, seamlessly houses the necessary power sources and a plethora of sensory apparatus, integral for the optimal operation of the system. Such a design emphasizes the convergence of aesthetics and functionality, ensuring both user engagement and utility. By amalgamating force sensors (e.g., sensors measuring force exerted on the drawing implement's tip) with absolute position sensing, the device is configured to record marks or tracings made by the drawing implement. These recordings can be employed for subsequent interactions in both digital and non-digital contexts.

A miniaturized iteration of the ballpoint drive may be incorporated into gaming apparatuses, such as joysticks, or more refined structures like thumb-sticks (FIGS. 14(A) and 14(B)). Users are envisioned to either interact directly with the ball or affix a stick atop the ball. Such a configuration is particularly advantageous for tasks demanding both active and passive force feedback. Contrastingly, conventional force feedback joysticks or trackballs, which typically manifest larger dimensions and increased weight, the disclosed compact invention aligns itself more with hand-held active force feedback thumb-sticks, such as Foldaway.

The mouse serves as a crucial interface for human-computer interaction. Introducing a force dimension can substantially enhance this interaction. As depicted in FIG. 11, the mouse-like form factor, combined with the drive mechanism's high back-drivability, empowers users with precision over cursor movement.

The lightweight design of the haptic ballpoint drive can supplant the tip of conventional canes, furnishing navigational force feedback to individuals who are either temporarily visually challenged (due to, for instance, wearing VR goggles as depicted in FIG. 15) or have permanent visual impairments (FIG. 16). Implementing robust motors can further equip the mechanism to provide physical support akin to a support cane. Its unique features, such as back-drivability, active movement, and braking capabilities, can be harnessed to aid users in maintaining their balance during locomotion.

In summary, the haptic-enabled stylus device described is an advanced technological tool designed to enhance interactive experiences with digital systems, particularly focusing on personalized learning and user engagement. This device integrates several key components and technologies to achieve its multifunctional capabilities.

1. Force Feedback System: At the core of the stylus is a force feedback system. This system is engineered to provide tactile sensations to the user, creating a more immersive interaction experience. It can simulate various physical sensations like resistance, vibrations, or motion, corresponding to the user's activities or commands within a digital environment. This is typically achieved through actuators within the stylus, which can be precisely controlled to produce the desired tactile effect.

2. Multi-modal Feedback Mechanisms: The device incorporates multi-modal feedback mechanisms, including both visual displays and the haptic feedback system. The visual displays can provide graphical representations, instructional cues, or feedback related to the user's interactions. These displays work in tandem with the haptic feedback, creating a cohesive and rich interactive experience.
3. Learning Predictor Module: A unique feature of this stylus is its learning predictor module. This AI-driven component is designed to learn from an individual user's interactions, optimizing the device's responses and feedback over time. It stores data regarding the user's interaction patterns, preferences, and responses to adapt and enhance future interactions. This personalized approach ensures a tailored experience for each user.
4. Integrated System for Collaboration: The stylus is equipped with an integrated system that enables seamless collaboration with a smart computing agent. This agent can interpret user utterances (via natural language processing), provide guidance, and assess the user's knowledge. This feature allows the stylus to function not just as a tool but as an interactive partner in learning and other applications.
5. Computer-Readable Storage Medium: The device contains a computer-readable storage medium with instructions crucial for its operation. These instructions enable the stylus to engage with the user, providing instructive feedback, understanding verbal commands, assessing user knowledge, and adjusting feedback mechanisms. This adaptability is based on individual user needs and evaluations made by the computing agent, ensuring a personalized and effective learning experience.
6. Mechanism to Track and Evaluate User's Knowledge: An essential aspect of the stylus is its ability to track and evaluate the user's knowledge and progress. This is likely achieved through sensors and software algorithms that analyze the user's interactions and responses. The device can then provide real-time feedback and make adjustments to the learning experience, ensuring that it is always aligned with the user's level of understanding and learning goals.

The haptic-enabled stylus device represents a convergence of haptic technology, AI, and user experience design. It stands out as a tool capable of enhancing the way users interact with digital content, learn new skills, and engage with intelligent computing agents. Its emphasis on personalization, adaptability, and tactile feedback positions it as a significant innovation in interactive technology.

The force feedback system in the haptic-enabled stylus device is a sophisticated feature designed to enhance the user's interaction experience by simulating various tactile sensations. This system is fundamentally engineered to provide physical feedback to the user, which corresponds to their actions or interactions within a digital environment facilitated by a computing agent. The key aspects of this system include the simulation of resistance, vibration, and motion cues. The system can simulate the feeling of resistance or pushback against the user's movements. For example, when a user is drawing a line using the stylus on a digital surface, the system can increase the resistance felt by the user as they cross over a virtual boundary or edge, providing a sensation similar to drawing over a physical ridge or bump. This resistance is typically generated through actuators within the stylus, which can apply varying degrees of force against the user's motion, depending on the context of the interaction. Vibration feedback is another critical aspect of the force feedback system. This involves the stylus emitting different patterns and intensities of vibrations to convey information or responses to the user. For instance, the device can use vibrations to alert the user of a new message, indicate an error, or confirm a selection. The vibrations can vary in intensity, frequency, and duration to convey different meanings or levels of urgency. The system can also provide motion cues, where the stylus can move or guide the user's hand in a specific direction. This feature is particularly useful in educational or training scenarios, where the stylus can guide the user's hand to perform a task correctly, such as drawing a complex shape or following a specific path. The motion cues can be subtle or pronounced, depending on the required guidance level. In all these cases, the sensations are contextually linked to the user's interaction with the computing agent. The computing agent, equipped with AI and machine learning capabilities, interprets the user's actions, and commands the force feedback system to respond appropriately. This interaction creates a more intuitive and immersive experience, as the tactile feedback is directly correlated to the user's actions in the digital environment, making the virtual interactions feel more realistic and tangible. The force feedback system in the haptic-enabled stylus significantly enhances the user's digital interaction experience, bridging the gap between virtual and physical sensations and providing a more engaging and effective way to interact with digital content.

The multi-modal feedback mechanisms in the haptic-enabled stylus device are designed to offer a comprehensive and immersive user experience by integrating auditory feedback alongside visual and haptic feedback. This integration of multiple feedback types is crucial in creating a more engaging and intuitive interaction environment, especially in contexts where the user is interacting with complex digital content or in learning scenarios. The addition of auditory feedback involves the stylus device being able to produce sounds or audio cues in response to user actions or as part of the interaction process with the computing agent. This auditory component can range from simple beeps and alerts to more complex sounds like spoken instructions, environmental sounds, or music. For instance, when a user successfully completes a task or makes a selection, the device might emit a confirmation sound. In educational applications, the stylus can provide verbal instructions or feedback, enhancing the learning experience. The auditory feedback is particularly beneficial in scenarios where visual attention may be divided or when the user's gaze is focused elsewhere. Audio cues can provide essential information without requiring the user to constantly look at a display. It also plays a crucial role in accessibility, offering an alternative feedback mode for users with visual impairments. he multi-modal nature of the feedback system means that auditory feedback is not standalone but works in concert with visual and haptic feedback. For example, a learning application might use visual cues (like highlighting a part of text or image), haptic cues (like vibration or resistance when the stylus moves over that highlighted area), and auditory cues (like reading out the text or providing additional information about the highlighted image) simultaneously. This multi-sensory approach can lead to a richer and more effective learning experience. By combining auditory feedback with visual and haptic feedback, the device caters to a broader range of sensory inputs, making the interaction more memorable and impactful. This multi-modal approach can also cater to different learning styles-auditory, visual, and kinesthetic-making the device versatile and effective for a wide range of users.

The learning predictor module within the haptic-enabled stylus device is a key feature that significantly enhances its adaptability and personalization capabilities. This module is specifically designed to analyze, learn from, and store data related to the individual user's interaction patterns, preferences, and responses. Its primary function is to optimize future interactions based on this accumulated knowledge, making the device more intuitive and user-centric over time. At its core, the learning predictor module functions by continuously monitoring and analyzing how a user interacts with the device and the digital environment it controls. This includes tracking the user's movements, choices, and commands while using the stylus. The module is adept at recognizing patterns in these interactions—for example, it can identify which features or functions the user prefers, how they typically respond to certain stimuli or challenges, and the common mistakes or difficulties they encounter. With this detailed understanding of the user's behavior and preferences, the learning predictor module is able to adapt the device's behavior in subsequent interactions. For example, if the module detects that a user frequently struggles with a particular task or command, it might offer more tailored assistance or simplified options in the future. Similarly, if it recognizes a preference for certain types of feedback or interaction modes, it can default to these preferences in similar future scenarios. This personalized approach means that the device becomes more aligned with the user's unique interaction style and needs over time. It moves away from a one-size-fits-all model to a more bespoke user experience. This is particularly beneficial in educational or training contexts, where the ability to adapt to a learner's individual pace and style can greatly enhance the effectiveness of the learning process. The module stores this interaction data, along with its analytical insights, to build a comprehensive profile of the user's interaction history. This stored data is then utilized to optimize future interactions. The module leverages this historical data to make more accurate predictions and provide more relevant feedback in subsequent sessions.

The smart computing agent integrated within the haptic-enabled stylus device is a sophisticated component designed to enhance user experience through real-time adaptation and personalized guidance. This agent utilizes advanced computing techniques, likely incorporating elements of artificial intelligence and machine learning, to analyze user interactions and feedback dynamically. As the user engages with the stylus device, the smart computing agent continuously monitors and analyzes these interactions. This includes tracking the user's movements, commands, and how they respond to different stimuli provided by the device. The agent is capable of processing a vast array of data points—from the pressure exerted on the stylus, the patterns of movement, to the choices and selections made by the user. This real-time analysis allows the agent to understand the user's behavior, preferences, and potential challenges they face during the interaction. Based on this ongoing analysis, the smart computing agent adapts its responses and the guidance it provides to the user. For instance, if the agent detects that the user is struggling with a specific function, it can offer additional instructions, simplify the task, or provide alternative methods to accomplish it. Similarly, if it identifies a particular interaction pattern or preference, it can adjust the device's settings or responses to align with these preferences in future interactions. The agent also takes into account the feedback received from the device itself. This includes both explicit feedback from the user (like commands or selections made) and implicit feedback (such as the ease or difficulty of use as inferred from interaction patterns). By integrating this feedback, the agent can fine-tune its understanding of the user's needs and preferences. The ability of the smart computing agent to adapt in real-time is particularly beneficial in learning and training contexts. It can provide a more personalized learning experience by adjusting the difficulty level of tasks, offering customized tips, or repeating certain instructions based on the user's performance. This dynamic adaptability ensures that the learning process is more effective and tailored to the individual user's pace and style.

The inclusion of a computer-readable storage medium in the haptic-enabled stylus device, containing instructions for executing advanced pretrained machine learning algorithms, is a significant feature that elevates the device's capability to offer nuanced and personalized interactions. This aspect of the device harnesses the power of machine learning to enhance the user experience, making it more adaptive and intuitive. The core of this feature lies in the sophisticated machine learning algorithms that have been pretrained on extensive datasets. These algorithms are designed to understand complex patterns, user behaviors, and preferences. Pretraining these algorithms on diverse and comprehensive datasets ensures that they have a foundational level of understanding and intelligence even before their first interaction with a specific user. This pretraining equips the device with a baseline capability to interpret and respond to a wide array of user inputs and scenarios effectively. The application of these advanced algorithms allows for more nuanced interactions between the user and the device. Unlike basic algorithms that might respond in a limited or predetermined manner, these advanced algorithms can interpret subtleties in user behavior and preferences. This capability enables the device to recognize not just explicit commands but also to infer user intentions from more subtle cues, leading to a more intuitive and responsive user experience. One of the key benefits of these algorithms is their ability to facilitate personalized interactions. By analyzing the user's interaction patterns, preferences, and responses, the device can adapt its behavior to align more closely with the individual user's needs. Over time, as the device continues to interact with the user, these algorithms enable it to learn and optimize its responses, making each interaction more tailored to the specific user. The presence of these algorithms on a computer-readable storage medium allows for continuous learning and adaptation. As the user interacts with the device, the algorithms process this new data, updating their understanding of the user and refining their responses accordingly. This dynamic learning process ensures that the device remains up to date with the user's changing needs and preferences. Thus, the inclusion of instructions for executing advanced pretrained machine learning algorithms on the device's computer-readable storage medium plays a critical role in enhancing the device's functionality. These algorithms enable the stylus to provide a highly personalized and nuanced interaction experience, adapting dynamically to the user's unique patterns and preferences. This feature not only improves the immediate usability of the device but also ensures that it remains relevant and effective over prolonged use.

The mechanism within the haptic-enabled stylus device for tracking and evaluating a user's knowledge represents a sophisticated application of machine learning techniques, aimed at personalizing and enhancing the learning experience. This feature is pivotal in adapting the learning content and feedback provided by the device, doing so in real-time and in alignment with the user's ongoing performance and progress. At the heart of this mechanism is the use of machine learning algorithms. These algorithms are designed to analyze the user's interactions, responses, and overall performance during various tasks or learning activities. By processing this data, the algorithms can assess the user's current knowledge level, identify areas of strength and weakness, and track their learning progress over time. This continuous assessment is critical for understanding the user's learning journey. Leveraging this assessment, the mechanism can then adapt the learning content in real-time. If the system identifies areas where the user is struggling, it can modify the difficulty level of the tasks, provide additional resources, or adjust the instructional approach. Conversely, if the user is excelling in certain areas, the system can offer more advanced content or challenges to ensure continued engagement and growth. In addition to adapting learning content, this mechanism also customizes the feedback provided to the user. This feedback can be in various forms—visual, auditory, or haptic—and is tailored based on the user's performance. For example, if a user consistently makes errors in a particular type of task, the feedback might focus on guiding them through the correct process, perhaps with more detailed explanations or demonstrations. The feedback is not static but evolves as the user's understanding and skills develop. By using machine learning to track and evaluate the user's knowledge, and then adapt both content and feedback accordingly, the device provides a highly personalized and effective learning experience. This approach ensures that the learning process is not one-size-fits-all but is instead tailored to meet each user's unique needs and learning pace. It can significantly enhance the efficacy of educational and training programs, making learning more engaging, efficient, and aligned with individual learner goals. The mechanism for tracking and evaluating user knowledge in the haptic-enabled stylus device, which utilizes advanced machine learning techniques, plays a crucial role in personalizing the learning experience. By analyzing user performance in real-time and adapting content and feedback accordingly, this feature ensures that each user receives a learning experience that is tailored to their specific needs, abilities, and progress, thereby maximizing the effectiveness of the learning process.

The force feedback system in the haptic-enabled stylus device is adeptly engineered not only to provide tactile sensations but also to guide the user's hand movements during tasks that require high precision, such as drawing or writing. This advanced feature is crucial in enhancing the functionality of the device, particularly in scenarios where accuracy and detail are paramount. In tasks like drawing or writing, where the accuracy of hand movements is crucial, the force feedback system plays a pivotal role. The system is configured to detect the user's movements and provide subtle yet effective physical cues through the stylus. For instance, if a user is drawing a straight line or a specific shape, the system can apply gentle resistance or directional nudges to keep the stylus on the desired trajectory. This form of guidance can be instrumental in helping users maintain steady lines or follow complex patterns, greatly enhancing the quality of their work. The force feedback system can also deliver corrective cues when deviations from the intended path are detected. If a user veers off course while drawing or writing, the system can provide immediate haptic feedback to alert the user and guide their hand back to the correct path. This feature is particularly beneficial for educational purposes, where learners are still developing their skills and can benefit from real-time, tactile guidance. The level of guidance provided by the force feedback system can be configured to suit the user's skill level or the specific requirements of the task. For beginners or those learning a new skill, the system can offer more pronounced guidance, essentially leading the user's hand through each motion. For more experienced users or less demanding tasks, the guidance can be subtler, providing only occasional corrections or confirmations. The ability of the force feedback system to guide hand movements elevates the user experience, making the device not just a tool for input but also an active participant in the user's task. This feature can accelerate skill development in drawing or writing, as users receive immediate, intuitive feedback through the sense of touch, which is often more effective than visual or auditory feedback alone. The force feedback system's capability to guide the user's hand movements is a significant advancement in the haptic-enabled stylus device. It enhances the device's utility in precision tasks, providing users with a tangible and intuitive way to improve their skills in activities like drawing and writing. This feature not only makes the device more user-friendly but also serves as an effective tool for learning and skill enhancement.

The visual displays in the multi-modal feedback mechanisms of the haptic-enabled stylus device play a critical role in enhancing the user's interactive experience. These displays are intricately configured to provide visual representations that are integral to the device's functionality, particularly in conveying information, instructions, and feedback. One of the key functions of the visual displays is to provide graphical representations of concepts that the user is interacting with. This can be particularly beneficial in educational or training contexts, where visual aids can significantly enhance understanding. For example, if a user is learning about geometric shapes, the visual display can show graphical representations of these shapes, changing and responding in real-time as the user interacts with the device. This visual component makes abstract concepts more concrete and comprehensible. Another important aspect of the visual displays is providing instructions and guidance. This can range from simple directional arrows and icons to more complex step-by-step instructions. In tasks that require precision or specific sequences of actions, such as technical drawing or solving complex problems, these visual cues can guide the user through the process, enhancing their ability to complete the task effectively. The visual displays also provide immediate feedback related to the user's interactions. This feedback can be in the form of success indicators, error messages, or even real-time corrections. For instance, if a user makes an error while drawing, the display can highlight the mistake and suggest a correction. Similarly, when a task is completed correctly, the display can provide positive reinforcement. This immediate visual feedback is crucial for learning, as it helps users understand their mistakes and learn from them. While the visual displays are powerful on their own, their effectiveness is greatly enhanced when integrated with the haptic and auditory feedback mechanisms of the device. This multi-modal approach ensures that users receive feedback through multiple senses, which can reinforce learning and improve the overall user experience. For example, haptic feedback indicating a raised edge on a digital surface can be accompanied by a visual display showing the edge's location and characteristics.

The wireless connectivity feature of the haptic-enabled stylus device to an intelligent computing agent significantly enhances its usability and versatility, particularly in various learning environments. This wireless aspect is crucial in providing a seamless and flexible user experience, free from the constraints typically associated with wired connections. The primary advantage of wireless connectivity is the increased mobility it offers. Users are not tethered to a specific workstation or location, allowing them to use the device in different settings. This mobility is particularly beneficial in educational environments where learning activities might take place in various contexts—from traditional classrooms to more dynamic settings like labs, outdoor locations, or field trips. The absence of wires also reduces setup complexity and potential clutter, making the device more user-friendly and accessible. Wireless connectivity facilitates the device's use in a range of learning environments, each with its own set of requirements and challenges. For example, in a classroom, students can use the device at their desks, moving freely without being hindered by cables. In more collaborative settings, such as group workshops or study sessions, the device can be easily passed around and used by different participants without the need for reconfiguring connections. The wireless connection to the intelligent computing agent ensures that the device can constantly communicate and synchronize with the computing system it's paired with. This means that any updates, feedback, or instructions from the computing agent are instantly transmitted to the device, ensuring that the user has the most current and relevant information at their fingertips. Additionally, any data or inputs from the device are immediately sent back to the computing agent for processing and analysis, facilitating a real-time interactive experience. The wireless nature of the device also allows it to adapt quickly to the user's needs. Whether it's shifting between different types of tasks or accommodating different user preferences, the lack of physical constraints means that the device can be readily adjusted or reoriented as needed. This adaptability is especially important in educational settings, where the needs and preferences can vary greatly from one user to another.

The integrated system for collaboration in the haptic-enabled stylus device, featuring a user interface that supports natural language input, significantly elevates the device's interactive capabilities. This system is designed to foster a more intuitive and human-like interaction between the user and the computing agent, making the device not just a tool, but more of an interactive partner. The core of this integrated system is its ability to understand and process natural language input. This means that users can interact with the device and the computing agent using everyday language, just as they would in a conversation with another human. This capability is achieved through advanced natural language processing (NLP) technologies embedded within the computing agent. Users can input commands, ask questions, or give instructions using spoken or written language, and the system is designed to interpret these inputs accurately. This feature significantly enhances the user experience. Natural language input is far more user-friendly and less restrictive compared to traditional input methods that require specific commands or structured syntax. It allows users to interact with the device in a way that feels more natural and intuitive. For instance, in an educational setting, a student can ask the device questions in their own words and receive responses that are tailored to their query and context. The ability to process natural language enables richer, more meaningful interactions between the user and the device. The computing agent can not only respond to direct queries but also engage in more complex interactions, such as providing explanations, offering suggestions, or even asking questions to the user. This two-way interaction enhances the learning and user experience, making it more engaging and effective. The natural language interface also allows the system to learn from each interaction, adapting its responses and suggestions based on the user's language and style. Over time, the system can become more attuned to the individual user's preferences and ways of expression, further personalizing the interaction.

The inclusion of various sensors in the haptic-enabled stylus device, such as pressure sensors, motion sensors, and touch-sensitive surfaces, significantly enhances its ability to capture and respond to the physical interactions of the user. These sensors play a crucial role in making the device more interactive and responsive to the user's actions, thereby enriching the overall user experience. Pressure sensors within the device are designed to detect and measure the amount of force exerted by the user. This can include the pressure applied while holding the stylus or pressing it against a surface. By accurately gauging this pressure, the device can respond in a manner that is proportionate to the force applied. For example, in a drawing application, the thickness or intensity of a line could vary based on how hard the user presses the stylus against the screen. This feature allows for a more nuanced and expressive interaction, similar to working with traditional drawing instruments. Motion sensors, such as accelerometers and gyroscopes, enable the device to track the movement and orientation of the stylus. These sensors can detect various motions like tilting, shaking, or swiping, which can be interpreted as specific commands or inputs. For instance, a quick shake of the stylus might be used to undo an action or tilting it could change tools or colors in an application. The ability to detect and respond to these motions makes the user experience more dynamic and can introduce novel ways of interacting with digital content. ouch-sensitive surfaces on the device allow for additional forms of input and interaction. These surfaces can detect the presence and movement of the user's fingers, enabling gesture-based controls and inputs. For example, sliding a finger along a touch-sensitive area of the stylus could adjust settings like volume or brush size, or tapping could be used to select menu options. This touch interaction adds another layer of control for the user, making the device more versatile and adaptable to different tasks. The integration of these sensors into the haptic-enabled stylus device transforms it into a more sophisticated and responsive tool. By capturing the nuances of the user's physical interactions, the device can provide a more personalized and intuitive user experience. It allows for a greater degree of control and expression in tasks such as drawing, writing, or navigating digital content, making the device not just an input tool but an extension of the user's own movements and intentions.

The inclusion of instructions for calibrating the device on the computer-readable storage medium, based on the user's individual preferences, and learning style, is an essential feature of the haptic-enabled stylus device. This calibration capability significantly enhances the device's adaptability and effectiveness, tailoring its operation to match the unique requirements and preferences of each user. The calibration process involves adjusting various parameters of the device to align with the user's individual preferences and learning style. This might include setting the sensitivity of the pressure sensors, customizing the feedback provided by the haptic mechanism, or adjusting the way visual and auditory feedback is presented. For instance, a user who prefers a more tactile learning experience can have the haptic feedback settings intensified, while another who relies more on visual cues can have the display settings adjusted for clarity and ease of use. This personalized calibration ensures that the device operates in a way that is most conducive to the user's comfort and learning efficiency. The calibration also takes into account the user's learning style. Different people have different ways of processing information—some learn better through visual means, others through auditory information, and still others through kinesthetic (touch and movement) experiences. The device can be calibrated to cater to these varying learning styles, perhaps providing more detailed visual explanations for a visual learner, or more interactive, hands-on feedback for a kinesthetic learner. The dynamic adjustment of feedback mechanisms in response to the complexity and nature of tasks being performed by the user is another pivotal feature of the haptic-enabled stylus device. This adaptability ensures that the device remains effective and user-friendly across a wide range of tasks, from simple to complex. The device's feedback mechanisms—including haptic, visual, and auditory feedback—are not static. They can adapt in real-time based on the complexity of the task at hand. For example, in a more complex task, the device might provide more detailed and frequent feedback to guide the user. In contrast, for simpler tasks, the feedback might be less intrusive, allowing the user to proceed with minimal intervention. The nature of the task also plays a role in how the feedback is adjusted. For tasks that require high precision, like drawing fine details, the haptic feedback might be more nuanced, providing subtle guidance. For more general tasks, like navigating through a menu, the feedback might be broader and more pronounced. This sensitivity to the nature and complexity of the task at hand ensures that the user receives the most appropriate level of guidance and support, enhancing both the efficiency and quality of their work. The calibration feature of the haptic-enabled stylus device allows for customization according to individual user preferences and learning styles, making the device more personalized and effective. Additionally, the dynamic adjustment of feedback mechanisms based on task complexity and nature ensures that the device remains versatile and user-friendly across a variety of tasks, providing appropriate levels of support and guidance when needed.

Although the present invention has been described with respect to various schematic representations (FIGS. 1-16), it should be understood that the proposed robotic companion device designed in the form of a stylus can be realized and implemented with varying shapes and sizes, and thus the present invention here should not be considered limited to the exemplary embodiments and processes described herein. The various dimensions may be modified to fit in specific application areas. Although particular embodiments of the invention have been described in detail for purposes of illustration, various modifications and enhancements may be made without departing from the spirit and scope of the invention.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. A person having ordinary skills in the art may implement the described functionality in varying ways for each application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods and devices is not limiting of the invention. Thus, the operation and behavior of the systems and methods and devices were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated.

The various aspects and embodiments disclosed are for purposes of illustration and are not intended to be limiting, with the true scope and spirit being indicated by the following claims.

What is claimed is:

1. A haptic-enabled stylus device comprising:
   one or more processors configured to provide tactile sensations to a user during interaction with a computing agent;
   multi-modal feedback mechanisms including visual displays and a haptic feedback system;
   a learning predictor designed to learn and optimize from the user's interactions;
   an integrated system for collaboration with the computing agent capable of interpreting the user's utterances, providing guidance, and assessing the user's knowledge;
   a computer-readable storage medium containing instructions for engaging with the user, providing instructive feedback, understanding the user's utterances, assessing the user's knowledge, and adjusting feedback mechanisms based on at least the individual user's needs; and
   a mechanism to track and evaluate the user's knowledge and progress, ensuring real-time feedback and adjustments to learning experience.

2. The haptic-enabled stylus device of claim 1, wherein the force feedback system is designed to simulate a variety of tactile sensations based on the user's interaction with the computing agent, including at least resistance, vibration, and motion cues.

3. The haptic-enabled stylus device of claim 1, wherein the multi-modal feedback mechanisms are further capable of providing auditory feedback in addition to visual and haptic feedback.

4. The haptic-enabled stylus device of claim 1, wherein the learning predictor module is configured to store data specific to the user's interaction patterns, preferences, and responses to optimize future interactions.

5. The haptic-enabled stylus device of claim 1, wherein the computing agent is designed to adapt its response and guidance based on real-time analysis of the user's interactions and feedback received from the device.

6. The haptic-enabled stylus device of claim 1, wherein the computer-readable storage medium includes instructions for executing advanced pretrained machine learning algorithms to facilitate more nuanced and personalized interactions.

7. The haptic-enabled stylus device of claim 1, wherein the mechanism to track and evaluate the user's knowledge utilizes machine learning techniques to adapt the learning content and feedback in real-time based on the user's performance and progress.

8. The haptic-enabled stylus device of claim 1, wherein the force feedback system is further configured to guide the user's hand movements during tasks requiring precision, such as drawing or writing.

9. The haptic-enabled stylus device of claim 1, wherein the visual displays in the multi-modal feedback mechanisms are configured to provide graphical representations of concepts, instructions, or feedback related to the user's interactions.

10. The haptic-enabled stylus device of claim 1, wherein the device is wirelessly connected to the computing agent, facilitating mobility and ease of use in various learning environments.

11. The haptic-enabled stylus device of claim 1, wherein the integrated system for collaboration includes a user interface that allows for natural language input and interaction with the computing agent.

12. The haptic-enabled stylus device of claim 1, further including sensors for capturing physical interactions of the user with the device, such as pressure sensors, motion sensors, or touch-sensitive surfaces.

13. The haptic-enabled stylus device of claim 1, wherein the computer-readable storage medium further includes instructions for calibrating the device based on the user's individual preferences and learning style.

14. The haptic-enabled stylus device of claim 1, wherein the feedback mechanisms are dynamically adjusted in response to the complexity and nature of the tasks being performed by the user.

15. A haptic-enabled stylus device comprising:
   a force feedback system configured to provide tactile sensations to a user during interaction with a computing agent;
   multi-modal feedback mechanisms including visual displays and a haptic feedback system;
   an integrated system for collaboration with the computing agent capable of interpreting the user's utterances, providing guidance, and assessing the user's knowledge; and
   a computer-readable storage medium containing instructions for engaging with the user, providing instructive feedback, understanding the user's utterances, assessing the user's knowledge, and adjusting feedback mechanisms based on at least the user's needs.

16. The haptic-enabled stylus device of claim 15, further comprising:
   a learning predictor designed to learn and optimize from the user's interactions; and
   a mechanism to track and evaluate the user's knowledge and progress, ensuring real-time feedback and adjustments to the learning experience.

* * * * *